United States Patent [19]
Yamashita et al.

[11] Patent Number: 5,729,455
[45] Date of Patent: Mar. 17, 1998

[54] TRACTION CONTROL SYSTEM FOR A VEHICLE RESPONSIVE TO A POSITION OF AN ACCELERATOR PEDAL

[75] Inventors: Tetsuhiro Yamashita; Koji Hirai; Kazuaki Nada; Hideharu Satou, all of Hiroshima-ken, Japan

[73] Assignee: Mazda Motor Corporation, Hiroshima-ken, Japan

[21] Appl. No.: 745,319

[22] Filed: Nov. 12, 1996

Related U.S. Application Data

[62] Division of Ser. No. 272,083, Jul. 8, 1994, Pat. No. 5,600,560.

[30] Foreign Application Priority Data

| Jul. 9, 1993 | [JP] | Japan | 5-194123 |
| Mar. 31, 1994 | [JP] | Japan | 6-87878 |

[51] Int. Cl.$^6$ ............................................. B60K 31/00
[52] U.S. Cl. ............................ 364/426.029; 180/197
[58] Field of Search .............. 364/426.1, 426.027, 364/426.029, 426.031, 426.032, 426.036; 180/197

[56] References Cited

U.S. PATENT DOCUMENTS

| 4,712,634 | 12/1987 | Lindemann | 180/197 |
| 4,951,773 | 8/1990 | Poirier et al. | 180/197 |
| 4,985,837 | 1/1991 | Togai | 364/426.031 |
| 5,025,881 | 6/1991 | Kanehiro et al. | 180/197 X |
| 5,033,573 | 7/1991 | Hrovat | 180/197 |
| 5,046,461 | 9/1991 | Iwata et al. | 364/424.03 |
| 5,103,399 | 4/1992 | Abe et al. | 180/197 |
| 5,107,429 | 4/1992 | Sol | 364/426.031 |
| 5,119,299 | 6/1992 | Tamura et al. | 364/426.031 |
| 5,155,686 | 10/1992 | Shiraishi et al. | 364/426.031 |
| 5,159,990 | 11/1992 | Satou et al. | 180/197 X |
| 5,222,570 | 6/1993 | Kawamura et al. | 180/197 |
| 5,236,332 | 8/1993 | Singleton et al. | 364/426.02 |
| 5,341,298 | 8/1994 | Yamashita | 180/197 |
| 5,366,039 | 11/1994 | Sawada | 180/197 |
| 5,431,242 | 7/1995 | Iwata et al. | 180/197 |
| 5,472,061 | 12/1995 | Shiraishi et al. | 180/197 |
| 5,600,560 | 2/1997 | Yamashita et al. | 180/197 |

FOREIGN PATENT DOCUMENTS 2-80728  6/1990  Japan.

*Primary Examiner*—Collin W. Park
*Attorney, Agent, or Firm*—Sixbey, Friedman, Leedom & Ferguson, P.C.; Gerald J. Ferguson, Jr.; Donald R. Studebaker

[57] ABSTRACT

In a traction control system for a vehicle provided with an engine having a supercharger, the traction control is terminated when the actual supercharging pressure is converged on a target supercharging pressure which is set according to the operating condition of the engine while the traction control by feedback control of the supercharging pressure is being effected.

5 Claims, 18 Drawing Sheets

FIG. 9

| | P | | | | | | | | | | |
|---|---|---|---|---|---|---|---|---|---|---|---|
| | −800 | | −600 | | | −400 | | | −200 (mmHg) | | |
| 500 | 0 | 1.0 | 2.0 | 2.0 | 3.0 | 4.0 | 5.0 | 6.0 | 7.0 | 8.0 | 9.0 | 10 |
| 1000 | 0 | 1.0 | 2.0 | 3.0 | 4.0 | 5.0 | 6.0 | 7.0 | 8.0 | 9.0 | 11 | 13 |
| | 0 | 1.0 | 3.0 | 4.0 | 5.0 | 6.0 | 7.0 | 8.0 | 10 | 12 | 13 | 15 |
| 2000 | 0 | 1.0 | 3.0 | 4.0 | 6.0 | 7.0 | 8.0 | 10 | 12 | 14 | 16 | 17 |
| | 0 | 2.0 | 3.0 | 5.0 | 7.0 | 9.0 | 11 | 13 | 15 | 17 | 19 | 20 |
| Ne 3000 | 0 | 2.0 | 3.0 | 6.0 | 8.0 | 10 | 12 | 15 | 17 | 19 | 20 | 22 |
| | 0 | 2.0 | 3.0 | 6.0 | 8.0 | 11 | 13 | 16 | 18 | 20 | 23 | 24 |
| 4000 | 0 | 2.0 | 4.0 | 7.0 | 9.0 | 12 | 14 | 17 | 19 | 21 | 23 | 25 |
| | 0 | 2.0 | 3.0 | 6.0 | 8.0 | 11 | 13 | 16 | 18 | 20 | 23 | 24 |
| 5000 | 0 | 2.0 | 3.0 | 6.0 | 8.0 | 10 | 12 | 15 | 17 | 19 | 22 | 23 |
| (rpm) | 0 | 2.0 | 3.0 | 6.0 | 8.0 | 10 | 12 | 15 | 17 | 19 | 20 | 22 |

FIG. 10

| | P | | | | | | | | | | |
|---|---|---|---|---|---|---|---|---|---|---|---|
| | −800 | | −600 | | | −400 | | | −200 (mmHg) | | |
| 500 | 0 | 0.9 | 1.8 | 1.8 | 2.7 | 3.6 | ... | ... | ... | ... | ... | ... |
| 1000 | 0 | 0.9 | 1.8 | ... | ... | ... | ... | ... | ... | ... | ... | ... |
| | 0 | 0.9 | 2.7 | ... | ... | ... | ... | ... | ... | ... | ... | ... |
| 2000 | 0 | 0.9 | 2.7 | ... | ... | ... | ... | ... | ... | ... | ... | ... |
| | 0 | 1.8 | 2.7 | ... | ... | ... | ... | ... | ... | ... | ... | ... |
| Ne 3000 | 0 | 1.8 | 2.7 | ... | ... | ... | ... | ... | ... | ... | ... | ... |
| | 0 | 1.8 | 2.7 | ... | ... | ... | ... | ... | ... | ... | ... | ... |
| 4000 | 0 | 1.8 | 3.6 | ... | ... | ... | ... | ... | ... | ... | ... | ... |
| | 0 | 1.8 | 2.7 | ... | ... | ... | ... | ... | ... | ... | ... | ... |
| 5000 | 0 | 1.8 | 2.7 | ... | ... | ... | ... | ... | ... | ... | ... | ... |
| (rpm) | 0 | 1.8 | 2.7 | ... | ... | ... | ... | ... | ... | ... | ... | ... |

FIG. 11

| Ne \ P | −800 | | | | | | | | | | | −200 (mmHg) |
|---|---|---|---|---|---|---|---|---|---|---|---|---|
| | | | −600 | | | −400 | | | | | | |
| 500 | 0 | 0.8 | 1.6 | 1.6 | ... | ... | ... | ... | ... | ... | ... | ... |
| 1000 | 0 | 0.8 | 1.6 | ... | ... | ... | ... | ... | ... | ... | ... | ... |
| | 0 | 0.8 | 2.4 | ... | ... | ... | ... | ... | ... | ... | ... | ... |
| 2000 | 0 | 0.8 | 2.4 | ... | ... | ... | ... | ... | ... | ... | ... | ... |
| | 0 | ... | ... | ... | ... | ... | ... | ... | ... | ... | ... | ... |
| 3000 | ... | ... | ... | ... | ... | ... | ... | ... | ... | ... | ... | ... |
| | ... | ... | ... | ... | ... | ... | ... | ... | ... | ... | ... | ... |
| 4000 | ... | ... | ... | ... | ... | ... | ... | ... | ... | ... | ... | ... |
| | ... | ... | ... | ... | ... | ... | ... | ... | ... | ... | ... | ... |
| 5000 | ... | ... | ... | ... | ... | ... | ... | ... | ... | ... | ... | ... |
| (rpm) | ... | ... | ... | ... | ... | ... | ... | ... | ... | ... | ... | ... |

FIG. 12

| Ne \ P | −800 | | | | | | | | | | | −200 (mmHg) |
|---|---|---|---|---|---|---|---|---|---|---|---|---|
| | | | −600 | | | −400 | | | | | | |
| 500 | 0 | 0.7 | 1.4 | 1.4 | ... | ... | ... | ... | ... | ... | ... | ... |
| 1000 | 0 | 0.7 | 1.4 | 2.1 | ... | ... | ... | ... | ... | ... | ... | ... |
| | 0 | 0.7 | 2.1 | 2.8 | ... | ... | ... | ... | ... | ... | ... | ... |
| 2000 | 0 | 0.7 | 2.1 | ... | ... | ... | ... | ... | ... | ... | ... | ... |
| | 0 | ... | ... | ... | ... | ... | ... | ... | ... | ... | ... | ... |
| 3000 | ... | ... | ... | ... | ... | ... | ... | ... | ... | ... | ... | ... |
| | ... | ... | ... | ... | ... | ... | ... | ... | ... | ... | ... | ... |
| 4000 | ... | ... | ... | ... | ... | ... | ... | ... | ... | ... | ... | ... |
| | ... | ... | ... | ... | ... | ... | ... | ... | ... | ... | ... | ... |
| 5000 | ... | ... | ... | ... | ... | ... | ... | ... | ... | ... | ... | ... |
| (rpm) | ... | ... | ... | ... | ... | ... | ... | ... | ... | ... | ... | ... |

FIG. 13

| | P | | | | | | | | | | |
|---|---|---|---|---|---|---|---|---|---|---|---|
| | −800 | | −600 | | −400 | | | −200 (mmHg) | | | |
| 500 | 0 | 0.6 | 1.2 | 1.2 | ... | ... | ... | ... | ... | ... | ... |
| 1000 | 0 | 0.6 | 1.2 | 1.8 | ... | ... | ... | ... | ... | ... | ... |
| | 0 | 0.6 | 1.8 | 2.4 | ... | ... | ... | ... | ... | ... | ... |
| 2000 | 0 | 0.6 | 1.8 | 2.4 | ... | ... | ... | ... | ... | ... | ... |
| | ... | ... | ... | ... | ... | ... | ... | ... | ... | ... | ... |
| Ne 3000 | ... | ... | ... | ... | ... | ... | ... | ... | ... | ... | ... |
| | ... | ... | ... | ... | ... | ... | ... | ... | ... | ... | ... |
| 4000 | ... | ... | ... | ... | ... | ... | ... | ... | ... | ... | ... |
| | ... | ... | ... | ... | ... | ... | ... | ... | ... | ... | ... |
| 5000 | ... | ... | ... | ... | ... | ... | ... | ... | ... | ... | ... |
| (rpm) | ... | ... | ... | ... | ... | ... | ... | ... | ... | ... | ... |

FIG. 14

| | P | | | | | | | | | | |
|---|---|---|---|---|---|---|---|---|---|---|---|
| | −800 | | −600 | | −400 | | | −200 (mmHg) | | | |
| 500 | 0 | 0.5 | 1.0 | 1.0 | 1.5 | ... | ... | ... | ... | ... | ... |
| 1000 | 0 | 0.5 | 1.0 | 1.5 | ... | ... | ... | ... | ... | ... | ... |
| | 0 | 0.5 | 1.5 | 2.0 | ... | ... | ... | ... | ... | ... | ... |
| 2000 | 0 | 0.5 | 1.5 | 2.0 | ... | ... | ... | ... | ... | ... | ... |
| | ... | ... | ... | ... | ... | ... | ... | ... | ... | ... | ... |
| Ne 3000 | ... | ... | ... | ... | ... | ... | ... | ... | ... | ... | ... |
| | ... | ... | ... | ... | ... | ... | ... | ... | ... | ... | ... |
| 4000 | ... | ... | ... | ... | ... | ... | ... | ... | ... | ... | ... |
| | ... | ... | ... | ... | ... | ... | ... | ... | ... | ... | ... |
| 5000 | ... | ... | ... | ... | ... | ... | ... | ... | ... | ... | ... |
| (rpm) | ... | ... | ... | ... | ... | ... | ... | ... | ... | ... | ... |

FIG. 15

| | \- 800 | | | | \- 600 | P | \- 400 | | | \- 200 (mmHg) | | |
|---|---|---|---|---|---|---|---|---|---|---|---|---|
| 500 | 0 | 0.4 | 0.8 | 0.8 | 1.2 | ... | ... | ... | ... | ... | ... | ... |
| 1000 | 0 | 0.4 | 0.8 | 1.2 | ... | ... | ... | ... | ... | ... | ... | ... |
| | 0 | 0.4 | 1.2 | 1.6 | ... | ... | ... | ... | ... | ... | ... | ... |
| 2000 | 0 | 0.4 | 1.2 | ... | ... | ... | ... | ... | ... | ... | ... | ... |
| | 0 | ... | ... | ... | ... | ... | ... | ... | ... | ... | ... | ... |
| Ne 3000 | ... | ... | ... | ... | ... | ... | ... | ... | ... | ... | ... | ... |
| | ... | ... | ... | ... | ... | ... | ... | ... | ... | ... | ... | ... |
| 4000 | ... | ... | ... | ... | ... | ... | ... | ... | ... | ... | ... | ... |
| | ... | ... | ... | ... | ... | ... | ... | ... | ... | ... | ... | ... |
| 5000 | ... | ... | ... | ... | ... | ... | ... | ... | ... | ... | ... | ... |
| (rpm) | ... | ... | ... | ... | ... | ... | ... | ... | ... | ... | ... | ... |

FIG. 16

| | \- 800 | | | | \- 600 | P | \- 400 | | | \- 200 (mmHg) | | |
|---|---|---|---|---|---|---|---|---|---|---|---|---|
| 500 | 0 | 0.3 | 0.6 | 0.6 | ... | ... | ... | ... | ... | ... | ... | ... |
| 1000 | 0 | 0.3 | 0.6 | 0.8 | ... | ... | ... | ... | ... | ... | ... | ... |
| | 0 | 0.3 | 0.8 | 1.2 | ... | ... | ... | ... | ... | ... | ... | ... |
| 2000 | 0 | 0.3 | 0.8 | 1.2 | ... | ... | ... | ... | ... | ... | ... | ... |
| | 0 | ... | ... | ... | ... | ... | ... | ... | ... | ... | ... | ... |
| Ne 3000 | ... | ... | ... | ... | ... | ... | ... | ... | ... | ... | ... | ... |
| | ... | ... | ... | ... | ... | ... | ... | ... | ... | ... | ... | ... |
| 4000 | ... | ... | ... | ... | ... | ... | ... | ... | ... | ... | ... | ... |
| | ... | ... | ... | ... | ... | ... | ... | ... | ... | ... | ... | ... |
| 5000 | ... | ... | ... | ... | ... | ... | ... | ... | ... | ... | ... | ... |
| (rpm) | ... | ... | ... | ... | ... | ... | ... | ... | ... | ... | ... | ... |

F I G. 17

| | P | | | | | | | | | | |
|---|---|---|---|---|---|---|---|---|---|---|---|
| | −800 | | −600 | | −400 | | | −200 (mmHg) | | | |
| 500 | 0 | 0.1 | 0.2 | 0.2 | ... | ... | ... | ... | ... | ... | ... |
| 1000 | 0 | 0.1 | 0.2 | 0.3 | ... | ... | ... | ... | ... | ... | ... |
| | 0 | 0.1 | 0.3 | 0.4 | ... | ... | ... | ... | ... | ... | ... |
| 2000 | 0 | 0.1 | 0.3 | 0.4 | ... | ... | ... | ... | ... | ... | ... |
| | 0 | 0.2 | ... | ... | ... | ... | ... | ... | ... | ... | ... |
| Ne 3000 | ... | ... | ... | ... | ... | ... | ... | ... | ... | ... | ... |
| | ... | ... | ... | ... | ... | ... | ... | ... | ... | ... | ... |
| 4000 | ... | ... | ... | ... | ... | ... | ... | ... | ... | ... | ... |
| | ... | ... | ... | ... | ... | ... | ... | ... | ... | ... | ... |
| 5000 | ... | ... | ... | ... | ... | ... | ... | ... | ... | ... | ... |
| (rpm) | ... | ... | ... | ... | ... | ... | ... | ... | ... | ... | ... |

F I G. 18

| | P | | | | | | | | | | |
|---|---|---|---|---|---|---|---|---|---|---|---|
| | −800 | | −600 | | −400 | | | −200 (mmHg) | | | |
| 500 | 0 | 0 | 0 | 0 | 0 | ... | ... | ... | ... | ... | ... |
| 1000 | 0 | 0 | 0 | 0 | 0 | ... | ... | ... | ... | ... | ... |
| | 0 | 0 | 0 | 0 | ... | ... | ... | ... | ... | ... | ... |
| 2000 | 0 | 0 | 0 | ... | ... | ... | ... | ... | ... | ... | ... |
| | 0 | ... | ... | ... | ... | ... | ... | ... | ... | ... | ... |
| Ne 3000 | ... | ... | ... | ... | ... | ... | ... | ... | ... | ... | ... |
| | ... | ... | ... | ... | ... | ... | ... | ... | ... | ... | ... |
| 4000 | ... | ... | ... | ... | ... | ... | ... | ... | ... | ... | ... |
| | ... | ... | ... | ... | ... | ... | ... | ... | ... | ... | ... |
| 5000 | ... | ... | ... | ... | ... | ... | ... | ... | ... | ... | ... |
| (rpm) | ... | ... | ... | ... | ... | ... | ... | ... | ... | ... | ... |

5,729,455

1

TRACTION CONTROL SYSTEM FOR A VEHICLE RESPONSIVE TO A POSITION OF AN ACCELERATOR PEDAL

This is a Divisional application of Ser. No. 08/272,083, filed Jul. 8, 1994, now U.S. Pat. No. 5,600,560.

BACKGROUND OF THE INVENTION

1. Field of the Invention

This invention relates to a traction control system for a vehicle, and more particularly to a traction control system for a vehicle in which the engine output is feedback-controlled so that slip of the driving wheels of the vehicle converges on a predetermined target value.

2. Description of the Prior Art

There has been known a traction control system for a vehicle which controls the traction of the vehicle in order to prevent deterioration of the accelerating performance due to slip of the driving wheels caused by an excessive driving torque, for instance, during acceleration. In the traction control, when the rate of slip of the driving wheels becomes excessive due to an excessive driving torque, the engine output is suppressed and/or braking force is applied to the driving wheels so that the rate of slip of the driving wheels calculated on the basis of the rotational speed of the driving wheels converges on a predetermined target value.

When the vehicle is provided with an engine having a supercharger, the supercharging pressure generated by the supercharger is sometimes controlled as a part of the engine output control.

In the traction control where the engine output is feedback-controlled to converge the rate of slip of the driving wheels to the target value, the following problem sometimes arises.

For example, in some supercharged engines, the supercharging pressure generated by the supercharger is feedback-controlled in order to maximize the output performance of the engine while ensuring the durability of the engine. That is, for instance, a pressure sensor is provided downstream of the supercharger and the supercharging pressure is controlled so that the difference between the actual supercharging pressure detected by the pressure sensor and a target supercharging pressure set according to the operating condition of the engine is nullified.

On the other hand, when the traction control is effected by feedback control of the supercharging pressure, the supercharging pressure is controlled so that the difference between the actual rate of slip of the driving wheels calculated on the basis of the rotational speed of the driving wheels and a target rate of slip set on the basis of, for instance, the vehicle speed is nullified. When the former is larger than the latter, the supercharging pressure is reduced and when the former is smaller than the latter, the supercharging pressure is increased. When the vehicle goes into a high-$\mu$ road (with a surface having a high friction coefficient) having a large gripping force from a low-$\mu$ road (with a surface having a low friction coefficient) having a small gripping force, the rotational speed of the driving wheels lowers and the rate of slip reduces, and accordingly, the supercharging pressure is increased. However, since the supercharging pressure is not increased beyond the target supercharging pressure, the boost signal is kept output so as to converge the rate of slip on the target rate of slip if the rate of slip does not reach the target rate of slip by the time the supercharging pressure reaches the target supercharging

2 pressure, whereby the traction control cannot be terminated despite the fact that the driving wheels are not slipping.

The similar problem arises wide in traction control systems where the engine output is feedback-controlled so that the actual rate of slip of the driving wheels converges on a target value.

In Japanese Unexamined Patent Publication No. 2(1990)-140437, there is disclosed a technical concept in which it is determined that the traction control is to be terminated when the throttle opening (the opening of the throttle valve of the engine) comes to conform to the accelerator opening (the amount of depression of the accelerator) which is controlled by the driver.

However, the prior art is directed to preventing the driving wheels from beginning slipping again when the throttle valve is opened after termination of the traction control and the engine output is increased, and is not based on the case where the traction control cannot be terminated due to feedback control of the engine output. At the same time, there is a possibility that the traction control is terminated when the throttle opening just temporarily comes to conform to the accelerator opening as well as a possibility that the driving wheels begins to slip again when the condition of the road surface abruptly changes, e.g., when the vehicle goes into a low-$\mu$ road gain, immediately after termination of the traction control. This deteriorates the reliability of the traction control system.

Depending on the running condition of the vehicle, the accelerator pedal is sometimes released during acceleration. When the traction control is being effected in such a case, the traction control variable is gradually reduced since the rate of slip of the driving wheels is reduced in response to reduction of the driving force due to release of the accelerator pedal. By the way, an indicator lamp is generally turned on while the traction control is being effected and turned off in response to release of the accelerator pedal. Accordingly when the accelerator pedal is depressed again after once released, the indicator lamp is turned on again unless the traction control variable has been converged on a normal state. Though giving rise to no problem so long as the driving wheels are slipping, this gives the driver a sense of incompatibility.

An attempt to overcome this problem by canceling the traction control variable upon release of the accelerator pedal will result in deterioration in response when the accelerator pedal is depressed again immediately after release of the same.

SUMMARY OF THE INVENTION

In view of the foregoing observations and description, the primary object of the present invention is to overcome the aforesaid problems in the traction control system for a vehicle in which the engine output is feedback-controlled to converge the rate of slip of the driving wheels on a target value, thereby improving the reliability of the traction control.

A traction control system in accordance with a first aspect of the present invention is for a vehicle provided with an engine having a supercharger and comprises a wheel speed detecting means for detecting the rotational speeds of the wheels of the vehicle (wheel speeds), a slip rate calculating means for calculating the rate of slip of the driving wheels on the basis of the wheel speeds detected by the wheel speed detecting means and an engine output controller which when the rate of slip of the driving wheels is larger than a predetermined value, feedback-controls the engine output by controlling at least the supercharging pressure produced by said supercharger so that the rate of slip of the driving wheels converge on a predetermined target value, wherein the improvement comprises a supercharging pressure detecting means for detecting the supercharging pressure produced by the supercharger, an operating condition detecting means for detecting the operating condition of the engine, and a traction control termination determining means which compares the actual supercharging pressure detected by the supercharging pressure detecting means with a target supercharging pressure set according to the operating condition of the engine when the traction control by feedback control of the supercharging pressure is being effected and determines that the traction control is to be terminated when the former converges on the latter.

In accordance with the first aspect of the present invention, the traction control is forcedly terminated when the supercharging pressure reaches a predetermined target value while the traction control is effected by control of the supercharging pressure. Accordingly, such a situation that the traction control is not terminated though the driving wheels slip no more can be avoided and the reliability of the traction control system can be improved.

In one embodiment of the first aspect of the present invention, the vehicle is provided with an indicator lamp which is turned on to indicate that the traction control is being effected and the indicator lamp is turned off when the traction control termination determining means determines that the traction control is to be terminated.

With this arrangement, since the indicator lamp is turned off when the traction control termination determining means determines that the traction control is to be terminated, the driver does not get a sense of incompatibility.

A traction control system in accordance with a second aspect of the present invention is for a vehicle provided with an engine and comprises a wheel speed detecting means for detecting the rotational speeds of the wheels of the vehicle (wheel speeds), a slip rate calculating means for calculating the rate of slip of the driving wheels on the basis of the wheel speeds detected by the wheel speed detecting means and an engine output controller which when the rate of slip of the driving wheels is larger than a predetermined value, feedback-controls the engine output so that the rate of slip of the driving wheels converge on a predetermined target value, wherein the improvement comprises a traction control termination determining means which determines that the traction control is to be terminated when an engine output control variable which increases engine output above the driver's engine output requirement is output while the traction control is being effected.

In accordance with the second aspect of the present invention, the traction control is forcedly terminated when an engine output control variable which increases engine output above the driver's engine output requirement is output while the traction control is being effected. Accordingly, such a situation that the traction control is not terminated though the driving wheels slip no more can be avoided and at the same time, the driving wheels cannot slip after termination of the traction control, whereby the reliability of the traction control system can be further improved.

A traction control system in accordance with a third aspect of the present invention comprises a wheel speed deflecting means for detecting the wheel speeds of the vehicle, a slip rate calculating means for calculating the rate of slip of the driving wheels on the basis of the wheel speeds detected by the wheel speed detecting means and an engine output controller which when the rate of slip of the driving wheels is larger than a predetermined value, feedback-controls the engine output so that the rate of slip of the driving wheels converge on a predetermined target value, and is characterized by a traction control termination determining means which determines that the traction control is to be terminated when the engine output does not change following an engine output control variable which tends to increase the engine output while the traction control is being effected.

In accordance with the third aspect of the present invention, the traction control is forcedly terminated when the engine output does not change following an engine output control variable which tends to increase the engine output while the traction control is being effected. Accordingly, such a situation that the traction control is not terminated though the driving wheels slip no more can be avoided and at the same time, the driving wheels cannot slip after termination of the traction control, whereby the reliability of the traction control system can be further improved.

A traction control system in accordance with a fourth aspect of the present invention comprises a wheel speed detecting means for detecting the wheel speeds of the vehicle, a slip rate calculating means for calculating the rate of slip of the driving wheels on the basis of the wheel speeds detected by the wheel speed detecting means and an engine output controller which when the rate of slip of the driving wheels is larger than a predetermined value, feedback-controls the engine output so that the rate of slip of the driving wheels converge on a predetermined target value, and is characterized by an engine output detecting means which detects the output of the engine, an engine output setting means which sets a target engine output on the basis of the engine output detected by the engine output detecting means and said rate of slip of the driving wheels so that the rate of slip of the driving wheels converge on the predetermined target value, said engine output controller controlling the engine so that the engine output converges on the target engine output, and a traction control termination determining means which determines that the traction control is to be terminated when the target engine output is kept larger than the driver's engine output requirement for a predetermined time.

In accordance with the fourth aspect of the present invention, since the engine output is detected and the target engine output is set on the basis of the engine output detected and the rate of slip of the driving wheels, a fine traction control reflecting the actual condition of the engine can be effected. Further since the traction control is forcedly terminated when the target engine output is kept larger than the driver's engine output requirement for a predetermined time, such a situation that the traction control is not terminated though the driving wheels slip no more can be avoided and at the same time, the driving wheels cannot slip after termination of the traction control, whereby the reliability of the traction control system can be further improved.

A traction control system in accordance with a fifth aspect of the present invention comprises a wheel speed detecting means for detecting the wheel speeds of the vehicle, a slip rate calculating means for calculating the rate of slip of the driving wheels on the basis of the wheel speeds detected by the wheel speed detecting means and an engine output controller which when the rate of slip of the driving wheels is larger than a predetermined value, feedback-controls the engine output so that the rate of slip of the driving wheels converge on a predetermined target value, and is characterized in that an accelerator position detecting means which detects depression of the accelerator pedal, an indicator lamp when the traction control is being effected, and an indicator lamp control means which controls turning on and off of the indicator lamp, the indicator lamp control means being arranged to turn off the indicator lamp when the accelerator position detecting means detects that the accelerator pedal is released and to inhibit the indicator lamp from being turned on when the accelerator position detecting means detects that the accelerator pedal is depressed again after it is once turned off even if the traction control variable remains unless the rate of slip of the driving wheels exceeds a threshold value for starting the traction control.

In accordance with the fifth aspect of the present invention, since the indicator lamp is not turned on when the accelerator pedal is depressed again after it is once turned off unless the rate of slip of the driving wheels exceeds a threshold value for starting the traction control even if the traction control variable is not still converged, the driver does not get a sense of incompatibility.

In one embodiment of the fifth aspect, the traction control system further includes a control gain changing means which increases a control gain of the feedback control variable when the accelerator position detecting means detects that the accelerator pedal is released.

With this arrangement, since the control gain of the feedback control variable is increased when the accelerator pedal is released, the operating condition of the engine can be quickly returned to the normal state.

BRIEF DESCRIPTION OF THE DRAWINGS

FIGS. 9 to 18 are first to tenth engine torque maps, respectively.

DESCRIPTION OF THE PREFERRED EMBODIMENTS

Figure 1:
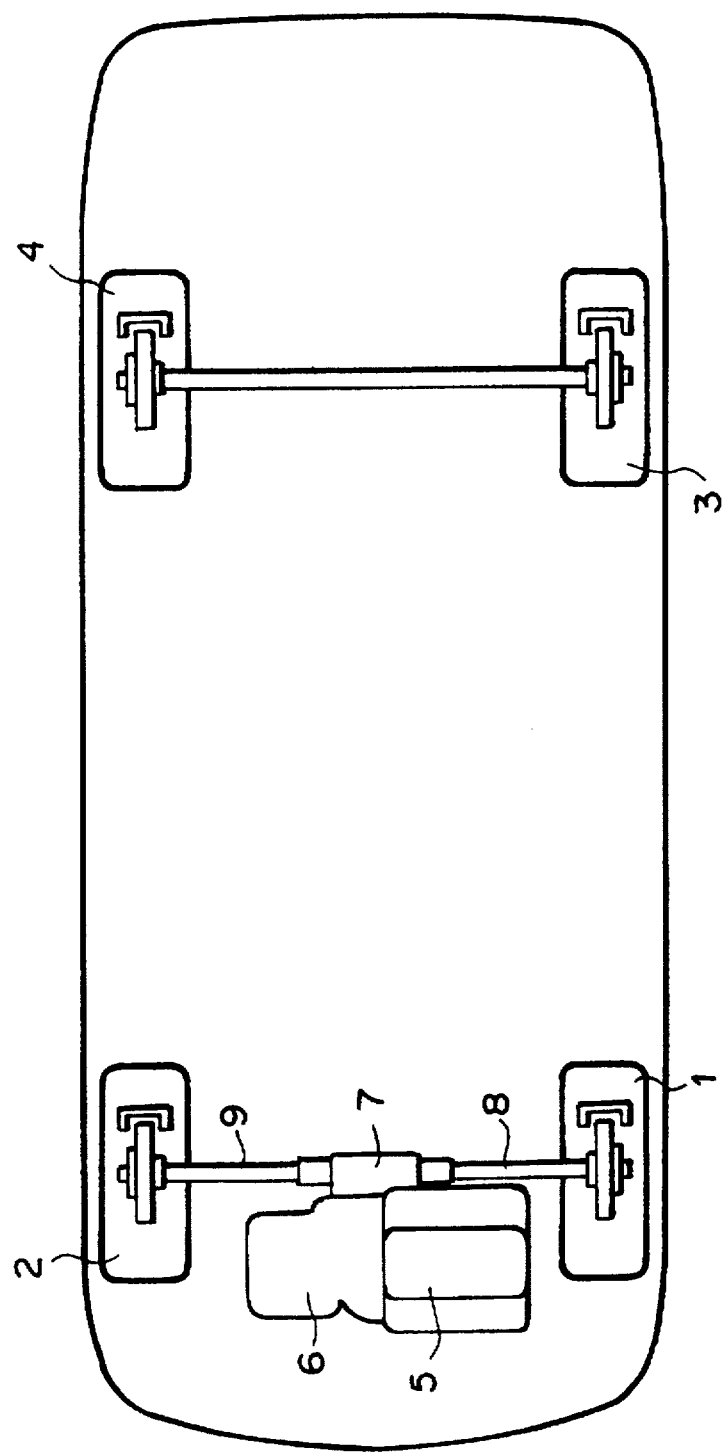
FIG. 1 is a schematic view of a vehicle to which the present invention is applied.

In FIG. 1, a vehicle is provided with left and right front wheels 1 and 2, left and right rear wheels 3 and 4 and an engine 5. The engine 5 is mounted on the front of the vehicle and its output torque is transmitted to the front wheels 1 and 2 through a transmission 6, a differential 7 and left and right drive shafts 8 and 9. That is, in this vehicle, the front wheels 1 and 2 are the driving wheels and the rear wheels 3 and 4 are the driven wheels.

Figure 2:
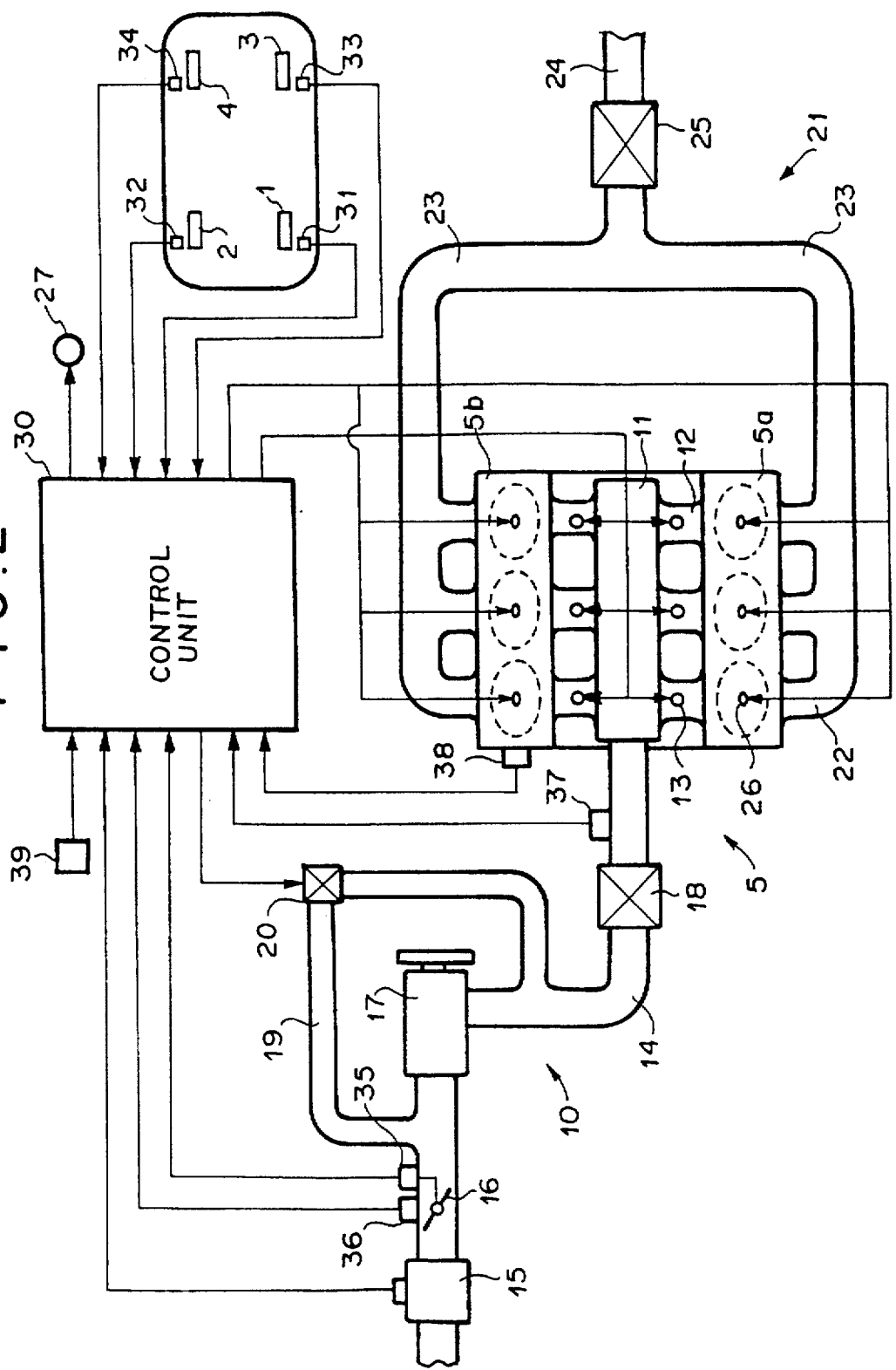
FIG. 2 is a schematic view showing the engine control system of a traction control system in accordance with a first embodiment of the present invention.

In a first embodiment, as shown in FIG. 2, the engine 5 is a V-6 engine having first and second (left and right) cylinder banks 5a and 5b, each comprising three cylinders. An intake system 10 for the engine 5 comprises a surge tank 11 and six discrete intake passages 12 are connected between the surge tank 11 and the respective cylinders in the first and second cylinder banks 5a and 5b. Fuel injection valves 13 are provided in the respective discrete intake passages 12. The surge tank 11 is connected to a common intake passage 14 and an airflow sensor 15 for detecting the amount of intake air, a throttle valve 16 which controls the amount of intake air or the engine output in response to movement of an accelerator pedal (not shown), a supercharger of screw type (Lysholm compressor) 17 and an intercooler 18 which cools intake air are disposed in the common intake passage 14 in this order from the upstream side. An bypass passage 19 which bypasses the supercharger 17 is connected to the common intake passage 14 and an air-bypass valve 20 for controlling the supercharging pressure produced by the supercharger 17 is disposed in the bypass passage 19. That is, when the air-bypass valve 20 is in the full closed state, the pressurized air discharged as from the supercharger 17 is distributed to the respective cylinders through the intercooler 18 and the surge tank 11. When the air-bypass valve 20 is opened, a part of the pressurized air discharged from the supercharger 17 returns to the upstream side of the supercharger 17 through the bypass passage 19, whereby the supercharging pressure is reduced.

The engine 5 has an exhaust system 21 comprising discrete exhaust passages 22 for the respective cylinders. The discrete exhaust passages 22 for the cylinders in the respective cylinder banks 5a and 5b are merged into a pair of exhaust passages 23 which are then merged into a single common exhaust passage 24. A catalytic converter 25 is provided in the common exhaust passage 24 at its intermediate portion.

The vehicle is provided with an electronic control unit 30. Wheel speed signals from wheel speed sensors 31 to 34 for detecting the wheel speeds of the left and right front wheels 1 and 2 and the left and right rear wheels 3 and 4, an intake air amount signal from the airflow sensor 15, a throttle opening signal from a throttle position sensor 35 which detects the opening of the throttle valve 16, an idle signal from an idle switch 36 which detects that the throttle valve 16 is in the full closed position, an intake air pressure signal from a pressure sensor 37 which detects the pressure of intake air downstream of the supercharger 17, a knock signal from a knock sensor 38 which detects detonation of the engine 5, an engine speed signal from an engine speed sensor 39 and the like are input into the control unit 30. The control unit 30 controls ignition timings of spark plugs 26 for the respective cylinders, controls the amount of fuel to be injected from the fuel injection valves 13 and controls the supercharging pressure by controlling the air-bypass valve 20. At the same time, when a predetermined traction control condition is satisfied, the control unit 30 effects traction control. When the traction control is being effected, the control unit 30 turns on a traction control indicator lamp 27.

The ignition timing control, the fuel injection control and the supercharging pressure control which are effected by the control unit 30 in the normal state will be briefly described, hereinbelow.

First the ignition timing control is effected in the following manner. The control unit 30 determines an optimal ignition timing according to the engine speed Ne represent by the signal from the engine speed sensor 39 and the amount Q of intake air represented by the signal from the airflow sensor 15 referring to an ignition timing map where the ignition timing is related to the engine speed Ne and the amount Q of intake air. Then the control unit 30 adds an ignition timing correction value calculated on the basis of the knock signal from the knock sensor 38 and the like to the optimal ignition timing and sets a final ignition timing. Then the control unit 30 outputs an ignition timing control signal so that the spark plugs 13 are actuated at the final ignition timing. When the frequency of knock calculated on the basis of the knock signal is higher than a predetermined value, the ignition timing correction value is set so that the ignition timing is immediately retarded and when the frequency of knock is below the predetermined value for a predetermined period, the ignition timing correction value is set so that the ignition timing is gradually advanced.

The fuel injection control is effected in the following manner. That is, the control unit 30 sets a base fuel injection amount on the basis of the engine speed Ne and the amount Q of intake air, and determines a final fuel injection amount by adding to the base fuel injection amount various correction values calculated on the basis of signals from various sensors such as a coolant temperature sensor (not shown). Then the control unit 30 outputs a fuel injection signal so that the fuel injection valves 13 inject fuel in the final injection amount.

Figure 3:
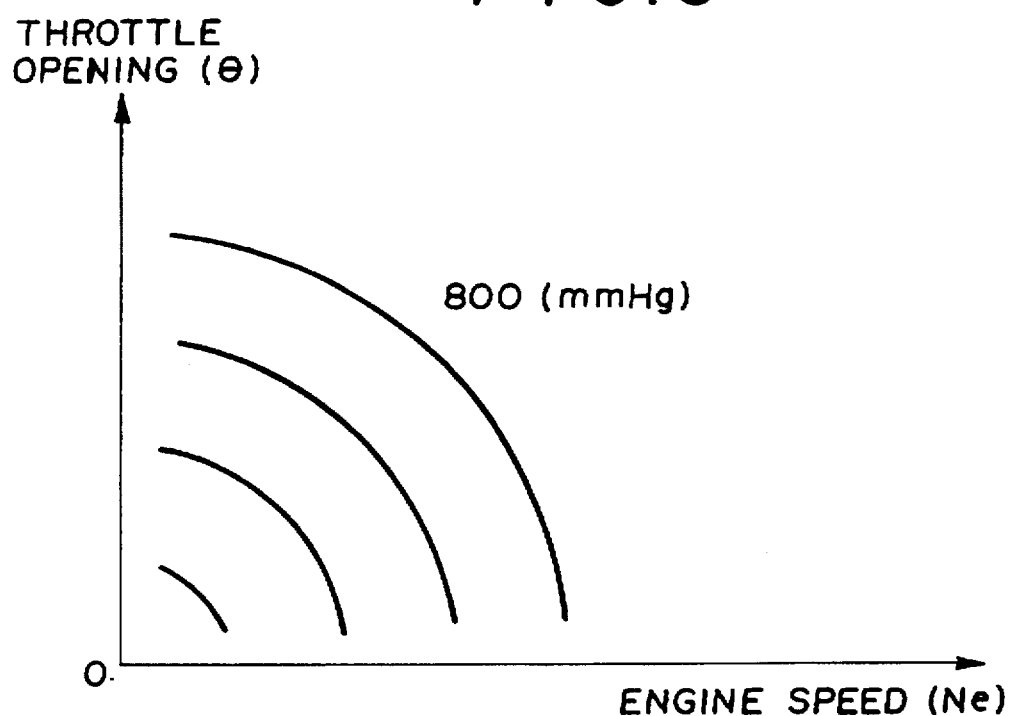
FIG. 3 is a target supercharging pressure map.

The supercharging pressure control is effected in the following manner. That is, the control unit 30 sets a target supercharging pressure Po to a value determined according to the engine speed Ne and the throttle opening θ referring to a target supercharging pressure map where the target supercharging pressure is related to the engine speed Ne and the throttle opening θ as shown in FIG. 3. Then the control unit 30 calculates the difference ΔP (=Po−P) between the pressure P of intake air detected by the pressure sensor 37 and the target supercharging pressure Po and feedback controls the opening of the air-bypass valve 20 in duty control so that the difference ΔP is nullified. That is, when the actual pressure P of intake air is lower than the target supercharging pressure Po, the control unit 30 outputs a valve drive signal which closes the air-bypass valve 20 and when the former is higher than the latter, the control unit 30 outputs a valve drive signal which opens the air-bypass valve 20.

The traction control will be described hereinbelow.

The control unit 30 adopts as the vehicle speed Vr the lower of the wheel speeds W3 and W4 of the left and right rear wheels 3 and 4 (the driven wheels) detected by the wheel speed sensors 33 and 34. Then the control unit 30 calculates the acceleration Va of the vehicle on the basis of change in the vehicle speed Vr, and sets a friction coefficient μ of the road surface to a value determined according to the vehicle speed Vr and the acceleration Va of the vehicle referring to a μ table (table 1) where the friction coefficient μ of the road surface is related to the vehicle speed Vr and the acceleration Va of the vehicle.

TABLE 1

| | 0 | | | Va | | | → | high |
|---|---|---|---|---|---|---|---|---|
| 0 | 1 | 1 | 2 | 2 | 3 | 3 | 4 | 4 | 5 |
| | 1 | 1 | 2 | 2 | 3 | 4 | 4 | 5 | 5 |
| | 1 | 1 | 2 | 3 | 3 | 4 | 4 | 5 | 5 |
| Vr | 1 | 1 | 2 | 3 | 4 | 4 | 5 | 5 | 5 |
| | 1 | 1 | 2 | 3 | 4 | 5 | 5 | 5 | 5 |
| | 1 | 2 | 2 | 4 | 4 | 5 | 5 | 5 | 5 |
| ↓ | 1 | 2 | 3 | 4 | 5 | 5 | 5 | 5 | 5 |
| high | 1 | 2 | 3 | 5 | 5 | 5 | 5 | 5 | 5 |

As can be seen from table 1, the friction coefficient μ of the road surface is increased with increase in the vehicle speed Vr and in the acceleration Va of the vehicle.

Then the control unit 30 sets a threshold value Ss for starting the traction control and a threshold value Se for terminating the traction control on the basis of the vehicle speed Vr and the friction coefficient μ of the road surface referring to preset threshold value maps. The threshold value Se for terminating the traction control is set smaller than the threshold value Ss for starting the traction control.

The control unit 30 calculates the rates of slip S1 of the left and right front wheels 1 and 2 by subtracting the vehicle speed Vr from the driving wheel speeds W1 and W2 (the wheel speeds W1 and W2 of the left and right front wheels 1 and 2), and averages the rates of slip S1 to calculate an average rate of slip SAv. When the larger of the rates of slip S1 of the left and right front wheels 1 and 2 (to be referred to as "the maximum rate of slip SHi", hereinbelow) is larger than the threshold value Ss for starting the traction control, the control unit 30 determines that the front wheels 1 and 2 are slipping and sets slip flag Fs to 1. When the maximum rate of slip SHi comes to be smaller than the threshold value Se for terminating the traction control, the control unit 30 determines that the driving wheels 1 and 2 are not slipping and resets the slip flag Fs to 0.

The control unit 30 effects the traction control by an engine control and/or a supercharging pressure control.

The engine control for the traction control is effected in the following manner. That is, the control unit 30 reads out a base value of a target rate of slip for the engine control from a map in which the base value is related to the vehicle speed Vr and the friction coefficienit μ of the road surface and sets a target rate of slip Te for the engine control by adding necessary corrections to the base value. Then the control unit 30 calculates the difference ΔSe between the target rate of slip Te for the engine control and the average rate of slip SAv and the rate of change DSe of the difference ΔSe, and reads out a base engine control level L on the basis of the difference ΔSe and the rate of change DSe of the difference ΔSe from a base engine control level map (table 2).

TABLE 2

|  | (−) ⟵ DSe ⟶ (+) | | | | | | |
|---|---|---|---|---|---|---|---|
| (−) ↑ ΔSe ↓ (+) | −3 | −2 | −1 | −1 | 0 | +1 | +1 |
|  | −3 | −1 | −1 | 0 | 0 | +1 | +1 |
|  | −2 | −1 | −1 | 0 | 0 | +1 | +1 |
|  | −2 | −1 | 0 | 0 | +1 | +1 | +1 |
|  | −2 | −1 | 0 | 0 | +1 | +1 | +2 |
|  | −1 | −1 | 0 | 0 | +1 | +1 | +2 |
|  | −1 | 0 | 0 | 0 | +1 | +1 | +2 |
|  | −1 | 0 | 0 | 0 | +1 | +1 | +3 |
|  | −1 | 0 | 0 | 0 | +1 | +2 | +3 |

Then the control unit 30 sets an engine control level FC within the range of 0 to 11 according to the following formula (1).

$$FC_K = FC_{K-1} + L \times G \quad (1).$$

Wherein $FC_{k-1}$ represents the preceding value of the engine control level FC and G represents a control gain which is normally 1.

The control unit 30 effects fuel cut and/or ignition timing retardation according to a fuel cut pattern and the amount of retardation of the ignition timing determined according to the engine control level FC thus obtained referring to a preset engine control table (table 3).

TABLE 3

| FC | cylinder | | | | | | retard |
|---|---|---|---|---|---|---|---|
|  | 1 | 2 | 3 | 4 | 5 | 6 |  |
| 1 |   |   |   |   |   |   | 5° |
| 2 |   |   |   |   |   |   | 15° |
| 3 | x | x |   |   |   |   |  |
| 4 | x | x |   |   |   |   |  |
| 5 | x | x |   |   |   |   | 10° |
| 6 | x | x | x |   |   |   |  |
| 7 | x | x | x |   |   |   | 10° |
| 8 | x | x | x | x |   |   |  |
| 9 | x | x | x | x |   |   | 10° |
| 10 | x | x | x | x | x |   |  |
| 11 | x | x | x | x | x | x |  |

In table 3, x indicates that fuel supply to the corresponding cylinder is to be cut. As can be seen from table 3, as the value of the engine control level FC increases the number of the cylinders fuel supply to which is to be cut increases and the engine output is lowered. Further when the ignition timing is retarded, the engine output is lowered.

The supercharging pressure control for the traction control is effected in the following manner. That is, the control unit 30 determines that the operating condition of the engine is in a supercharging range when the pressure P of intake air represented by the signal from the pressure sensor 37 is higher than the atmospheric pressure, and in the supercharging range, the control unit 30 feedback-controls the opening of the air-bypass valve 20 on the basis of the pressure P of intake air so that the supercharging pressure converges on the target supercharging pressure Po determined according to the engine speed Ne and the throttle opening θ referring to the target supercharging pressure map shown in FIG. 3.

Simultaneously with such a basic control, the control unit 30 reads out a base value of a target rate of slip for the supercharging pressure control from a map in which the base value is related to the vehicle speed Vr and the friction coefficient μ of the road surface and sets a target rate of slip Tb for the supercharging pressure control by adding necessary corrections to the base value. Then the control unit 30 calculates the difference ΔSb, between the target rate of slip Tb for the supercharging pressure control and the average rate of slip SAv and the rate of change DSb of the difference ΔSb, and sets an opening/closing speed (%/sec) of the air-bypass valve 20 on the basis of the difference ΔSb and the rate of change DSb of the difference ΔSb referring to an opening/closing speed map shown in table 4 where the opening/closing speeds of the air-bypass valve 20 are represented by control labels. The control labels in table 4 correspond to the opening/closing speeds of the air-bypass valve 20 as shown in table 5.

TABLE 4

|  | (−) ⟵ DSb ⟶ (+) | | | | | | |
|---|---|---|---|---|---|---|---|
| (−) ↑ ΔSb ↓ (+) | NB | NB | NB | NB | NM | ZO | ZO |
|  | NM | NM | NM | NM | NS | ZO | ZO |
|  | NM | NM | NM | NS | ZO | ZO | ZO |
|  | NS | NS | NS | ZO | ZO | ZO | ZO |
|  | ZO | ZO | ZO | ZO | PS | PS | PS |
|  | ZO | ZO | PS | PM | PM | PM | PM |
|  | ZO | ZO | PM | PB | PB | PB | PB |

TABLE 5

| label | NB | NM | NS | ZO | PS | PM | PB |
|---|---|---|---|---|---|---|---|
| speed | −8 | −5 | −2 | 0 | +2 | +5 | +10 |

In tables 4 and 5, ZO represents that the opening of the air-bypass valve 20 is to be held, N represents that the air-bypass valve 20 is to be closed and P represents that the air-bypass valve 20 is to be opened. S, M and B attached to N and P respectively stand for a small control variable, a middle control variable and a large control variable. For example, the control label PB represents that the air-bypass valve 20 is to be opened at a maximum speed (10%/sec). The opening of 100% corresponds to the state the air-bypass valve 20 is full opened.

The basic operation of the traction control by the control unit 30 will be described, hereinbelow.

Figure 4:
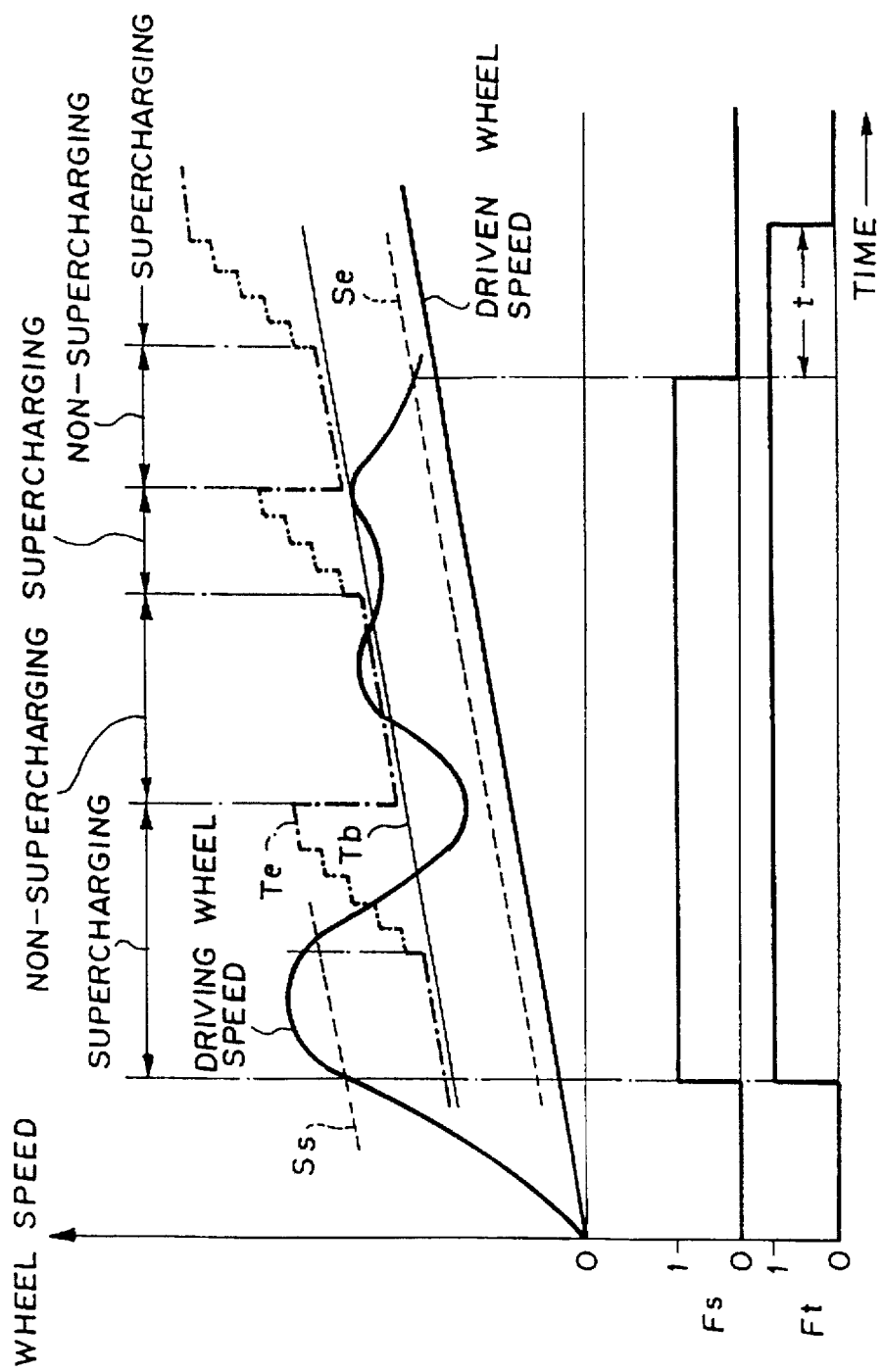
FIG. 4 is a time chart for illustrating an example of the traction control.

For example, when the maximum rate of slip SHi of the driving wheels exceeds the threshold value Ss for starting the traction control for the first time in the supercharging range as shown in FIG. 4, the control unit 30 sets slip flag Fs to 1 and then initiates the traction control where the engine control and the supercharging pressure control are effected in combination with each other. At this time, traction flag Ft is set to 1 to indicate that the traction control is being effected and the indicator lamp 27 is turned on. In a period immediately after initiation of the traction control, the target rate of slip Te for the engine control and the target rate of slip Tb for the supercharging pressure control are set substantially equal to each other. Accordingly, the engine control and the supercharging pressure control are simultaneously effected and the first spin state where the driving wheels 1 and 2 are excessively slipping is quickly suppressed.

At a predetermined timing when the driving wheel speed begins to fall from a maximum value, the target rate of slip Te for the engine control begins to be stepwise increased until it reaches a predetermined value, whereby the engine control level FC is quickly converged on 0. That is, virtually only the supercharging pressure control is effected and the temperature of the catalytic converter 27 is prevented from rising abnormally high.

Further since the target rate of slip Te for the engine control is gradually increased, even if a large slip occurs after the first spin state is suppressed, the engine control is effected in addition to the supercharging pressure control so long as the rates of slip S1 and S2 are above the target rate of slip Te for the engine control at that time, whereby the slip can be quickly suppressed.

When the operating condition shifts to the non-supercharging range from supercharging range, the target rate of slip Te for the engine control is quickly lowered near to the target rate of slip Tb for the supercharging pressure control.

In the non-supercharging range, only the engine control is effected. When the rates of slip of the driving wheels 1 and 2 are lowered by the engine control and the engine control level FC becomes 0, the engine output increases to a value corresponding to the throttle opening θ. In this case, the operating condition of the engine sometimes shifts to the supercharging range.

When the operating condition of the engine shifts to the supercharging range from the non-supercharging range, the target rate of slip Te for the engine control begins to be stepwise increased until it reaches a predetermined value. Also in this case, the engine control level FC is quickly converged on 0, and virtually only the supercharging pressure control is effected.

The control described above is repeated until the maximum rate of slip SHi falls below the threshold value Se for terminating the traction control. When the maximum rate of slip SHi falls below the threshold value Se for terminating the traction control, the slip flag Fs is reset to 0 and the traction flag Ft is reset to 0 after a predetermined time t. The traction control is terminated in this manner.

The termination of the traction control which is the important feature of the first embodiment will be described in more detail with reference to the flow chart shown in FIG. 5.

Figure 5:
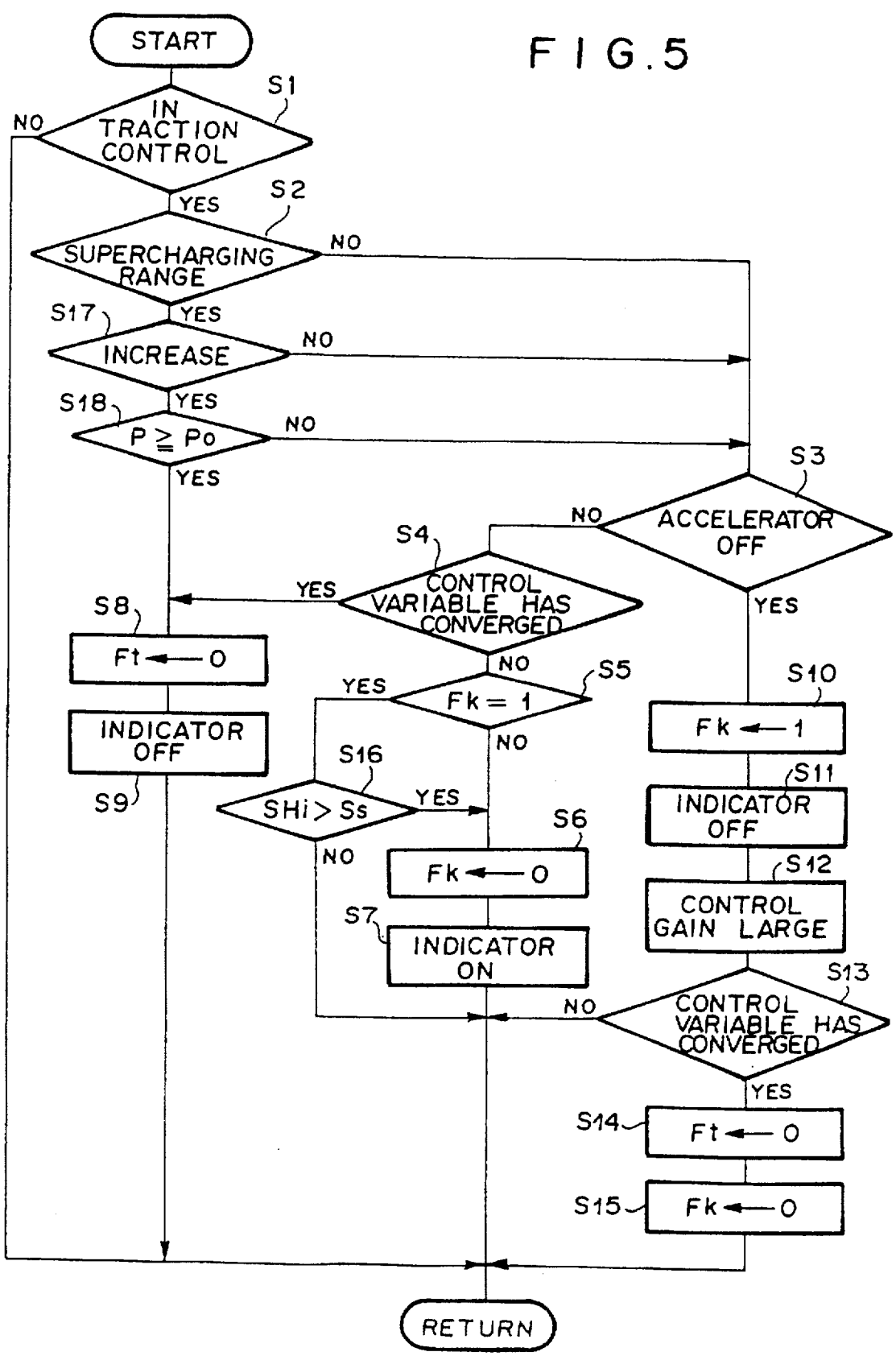
FIG. 5 is a flow chart for illustrating an embodiment of the traction control terminating operation.

In FIG. 5, the control unit 30 determines whether the traction control is being effected. (step S1) When it is determined that the traction control is being effected, the control unit 30 further determines in step S2 whether the operating condition of the engine is in the supercharging range, and when it is determined that the operating condition of the engine is not in the supercharging range, the control unit 30 determines (in step S3) on the basis of the signal from the idle switch 36 whether the accelerator pedal has been released.

When it is determined that the accelerator pedal has not been released, the control unit 30 determines in step S4 whether the control variable has been converged on a non-control state. That is, for instance, it is determined whether the engine control level FC has been converged on 0 which represents the non-control state. When it is determined that the control variable has not been converged on the non-control state, the control unit 30 then determines in step S5 whether indicator inhibition flag Fk has been set to 1. When it is determine that the indicator inhibition flag Fk has not been set to 1, the control unit 30 turns on the indicator lamp 27 in step S7 after resetting the indicator inhibition flag Fk to 0. Thus the indicator lamp 27 is kept on.

When it is determined in step S4 that the control variable has been converged on the non-control state, the control unit 30 resets the traction flag Ft to 0 in step S8 and then turns off the indicator lamp 27 in step S9.

When it is determined in step S3 that the accelerator pedal has been released, the control unit 30 sets the indicator inhibition flag Fk to 1 in step S10 and turns off the indicator lamp 27. Thereafter, the control unit 30 increases the control gain G in the aforesaid formula (1). Then the control unit 30 determines in step S13 whether the control variable has been converged on the non-control state. When it is determined that the control variable has been converged on the non-control state, the control unit 30 resets the traction flag Ft to 0 in step S14 and resets the indicator inhibition flag Fk to 0 in step S15.

In this manner, the control gain G for the engine control is increased when the accelerator pedal is released, and accordingly the engine control level FC is more quickly converged on 0 than in termination of the traction control in the normal state, whereby the control state of the engine returns to the normal state in a shorter time.

When the accelerator pedal is depressed again before the control variable (the engine control level FC) is converged on 0, the control unit 30 proceeds to step S16 through steps S3, S4 and S5 and determines whether the maximum rate of slip SHi of the driving wheels is higher than the threshold value Ss for starting the traction control. When it is determined that the former is not higher than the latter, the control unit 30 directly returns and accordingly, the indicator lamp which has been off since the accelerator pedal was turned off is turned on again. Thus the driver is not given a sense of incompatibility.

When it is determined in step S2 that the operating condition of the engine is in the supercharging range, the control unit 30 determines in step S17 whether the supercharging pressure is being increased in the supercharging pressure control. That is, whether the control label (representing the opening/closing speed of the air-bypass valve 20) is one of NB, NM and NS is determined. When it is determined that the supercharging pressure is being increased, the control unit 30 determines in step S18 whether the pressure P of intake air is not lower than the target supercharging pressure Po corresponding to the operating condition of the engine. When it is determined that the pressure P of intake air is not lower than the target supercharging pressure Po, the control unit 30 resets the traction flag Ft to 0 to forcefully terminate the traction control.

Accordingly, for example when the vehicle goes into a high-μ road from a low-μ road and the rate of slip reduces, the traction control can be surely terminated.

Another embodiment of termination of the traction control by the supercharging pressure control will be described with reference to the flow chart shown in FIG. 6, hereinbelow.

Figure 6:
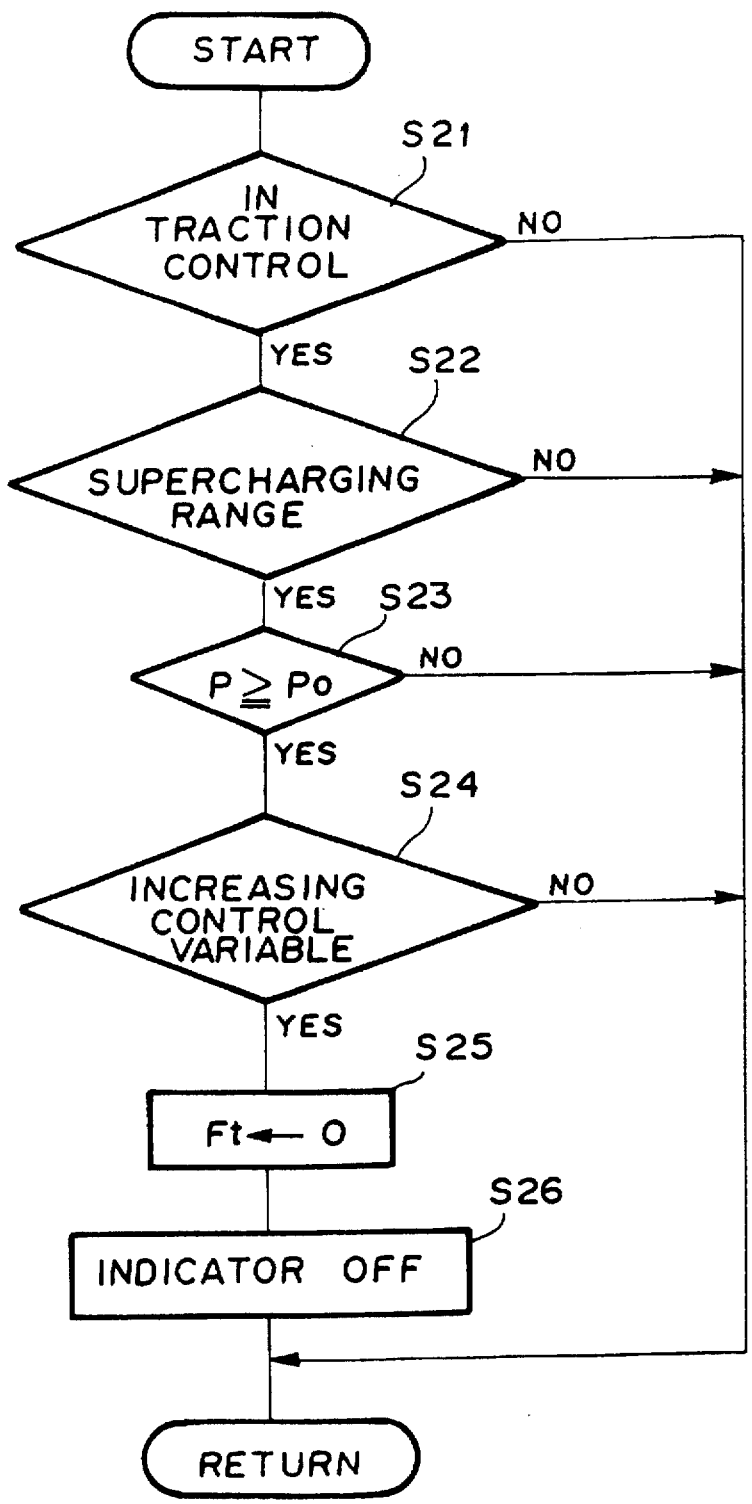
FIG. 6 is a flow chart for illustrating another embodiment of the traction control terminating operation.

In FIG. 6, the control unit 30 determines whether the traction control is being effected. (step S21) When it is determined that the traction control is being effected, the control unit 30 further determines in step S22 whether the operating condition of the engine is in the supercharging range. When it is determined in step S22 that the operating condition of the engine is in the supercharging range, the control unit 30 determines in step S23 whether the pressure P of intake air is not lower than the target supercharging pressure Po corresponding to the operating condition of the engine. When it is determined that the pressure P of intake air is not lower than the target supercharging pressure Po, the control unit 30 determines whether the control variable has been set to increase the supercharging pressure (NB, NM or NS), i.e., whether the air-bypass valve drive signal is such as to increase the engine output torque over the driver's engine output torque requirement represented by the opening of the throttle valve 16 which is interlocked with the accelerator pedal. When it is determined that the control variable has been set to increase the supercharging pressure, the control unit 30 resets the traction flag Ft to 0 in step S25 and turns off the indicator lamp 27 in step S26. Also in this embodiment, when the vehicle goes into a high-μ road from a low-μ road and the rate of slip reduces, the traction control can be surely terminated. At the same time, since the traction control is terminated when the control variable is set so as to increase the supercharging pressure in the state where the intake air pressure P has been fixed to the target supercharging pressure Po, the driving wheels cannot slip again after termination of the traction control.

Still another embodiment of termination of the traction control by the supercharging pressure control will be described with reference to the flow chart shown in FIG. 7, hereinbelow.

Figure 7:
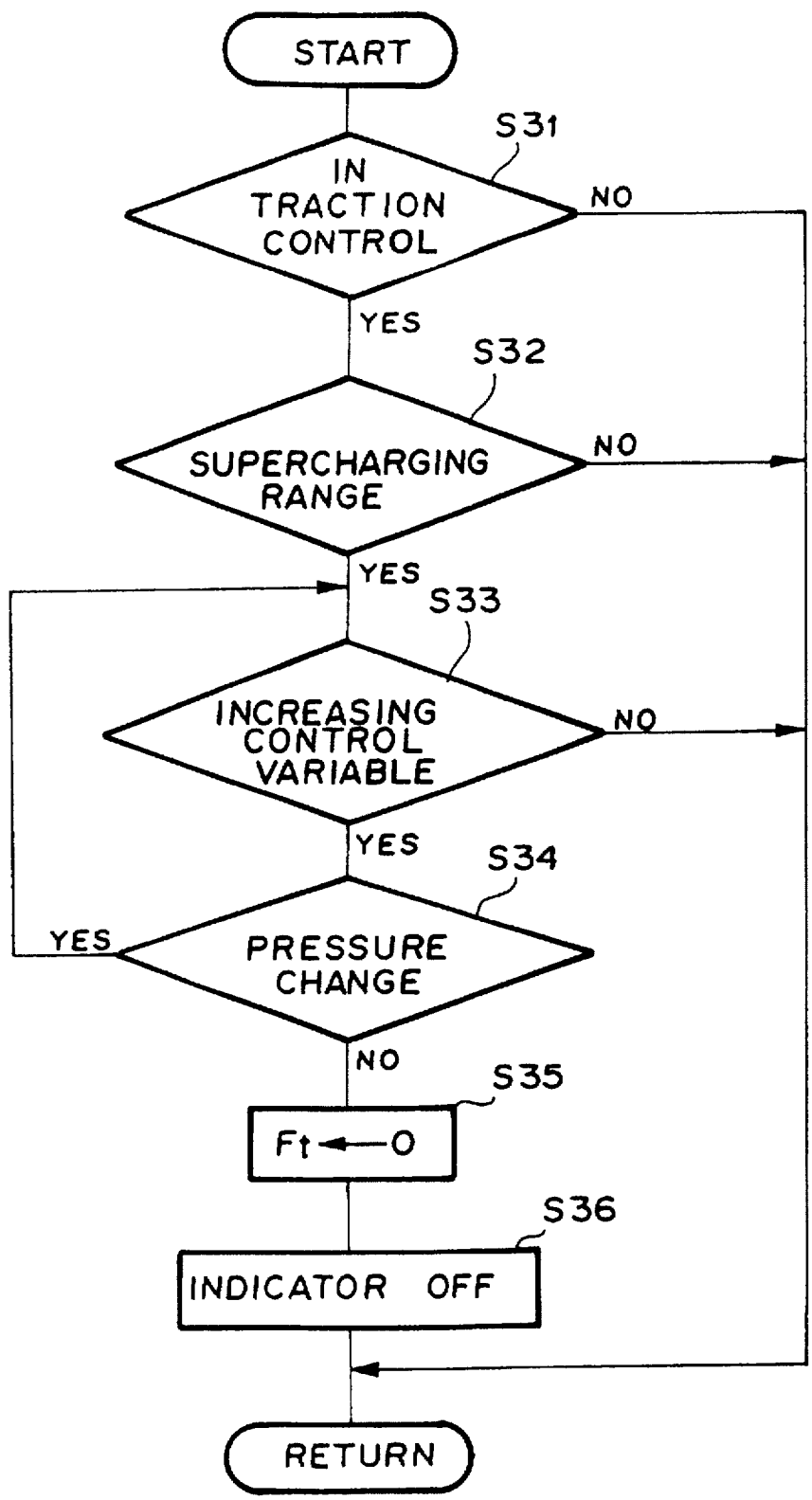
FIG. 7 is a flow chart for illustrating still another embodiment of the traction control terminating operation.

In FIG. 7, the control unit 30 determines whether the traction control is being effected. (step S31) When it is determined that the traction control is being effected, the control unit 30 further determines in step S32 whether the operating condition of the engine is in the supercharging range. When it is determined in step S32 that the operating condition of the engine is in the supercharging range, the control unit 30 determines in step S33 whether the control variable has been set to increase the supercharging pressure. When it is determined that the control variable has been set to increase the supercharging pressure, the control unit 30 determines in step S34 whether there is a change in the intake air pressure P detected by the pressure sensor 37. That is, the control unit 30 determines whether the intake air pressure P has been fixed to the target supercharging pressure Po corresponding to the driver's engine output torque requirement. When it is determined that the intake air pressure P does not change though the control variable has been set to increase the supercharging pressure, the control unit 30 resets the traction flag Ft to 0 in step S35 and turns off the indicator lamp 27 in step S36. Also in this embodiment, when the vehicle goes into a high-μ road from a low-μ road and the rate of slip reduces, the traction control can be surely terminated. At the same time, since the traction control is terminated when the control variable is set so as to increase the supercharging pressure in the state where the intake air pressure P has been fixed to the target supercharging pressure Po, the driving wheels cannot slip again after termination of the traction control.

A traction control system in accordance with a second embodiment of the present invention will be described, hereinbelow.

Figure 8:
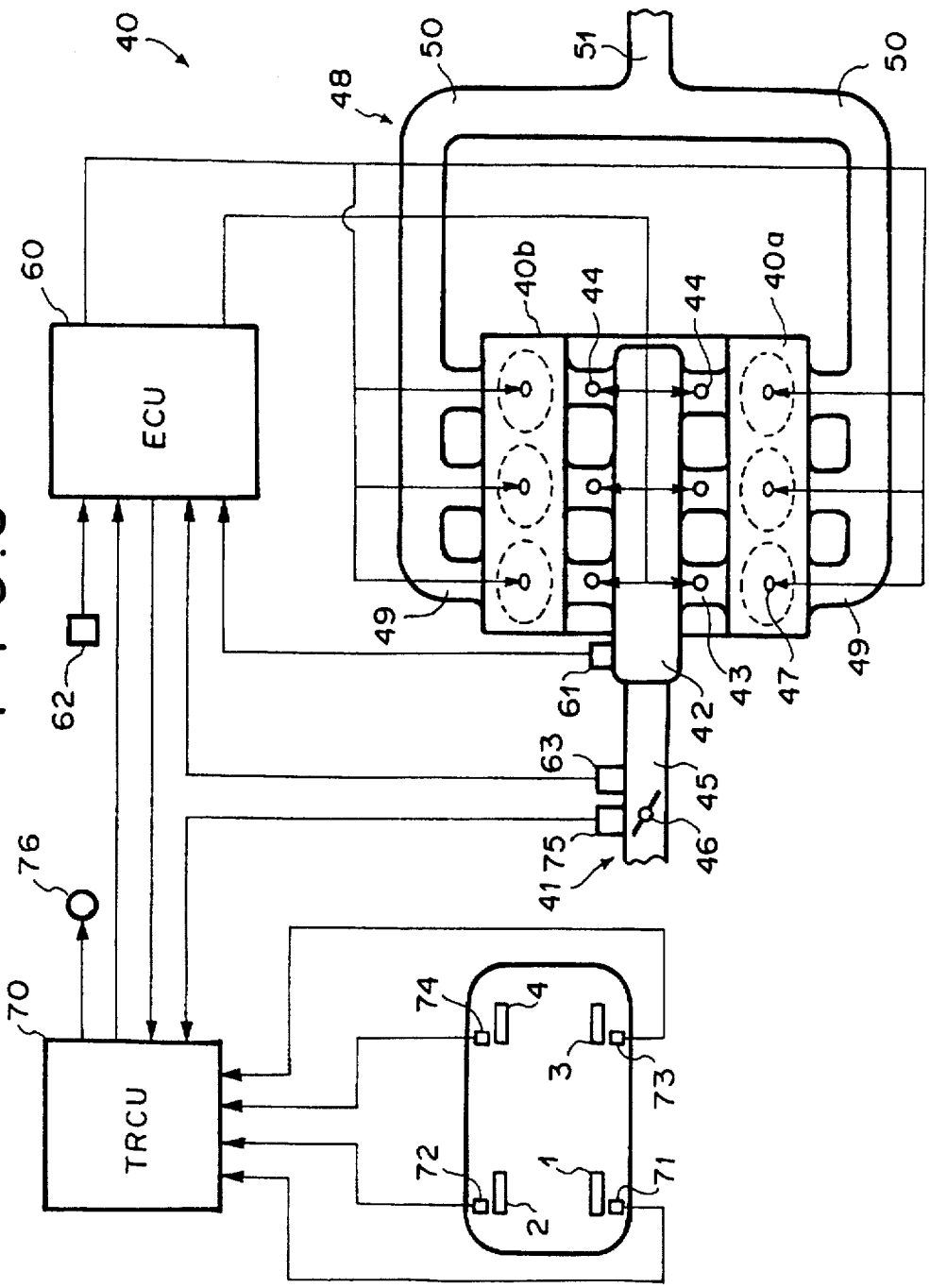
FIG. 8 is a schematic view showing the engine control system of a traction control system in accordance with a second embodiment of the present invention.

In the second embodiment, as shown in FIG. 8, the vehicle is provided with a V-6 engine 40 having first and second (left and right) cylinder banks 40a and 40b, each comprising three cylinders. An intake system 41 for the engine 40 comprises a surge tank 42 and six discrete intake passages 43 are connected between the surge tank 42 and the respective cylinders in the first and second cylinder banks 40a and 40b. Fuel injection valves 44 are provided in the respective discrete intake passages 43. The surge tank 42 is connected to a common intake passage 45 and a throttle valve 46 which controls the amount of intake air or the engine output in response to movement of an accelerator pedal (not shown) is disposed in the common intake passage 45. Each of the cylinders is provided with a spark plug 47.

The engine 40 has an exhaust system 48 comprising discrete exhaust passages 49 for the respective cylinders. The discrete exhaust passages 49 for the cylinders in the respective cylinder banks 40a and 40b are merged into a pair of exhaust passages 50 which are then merged into a single common exhaust passage 51. A catalytic converter (not shown) is provided in the common exhaust passage 51.

The vehicle is provided with an engine control unit 60 and a traction control unit 70 which are communicated with each other to give and take signals.

The engine control unit 60 receives an intake air pressure signal from a pressure sensor 61 provided in the surge tank 42, an engine speed signal from an engine speed sensor 62, a throttle opening signal from a throttle position sensor 63 which detects the opening of the throttle valve 46 and the like. The engine control unit 60 controls ignition timings of spark plugs 47 for the respective cylinders and the amount of fuel to be injected from the fuel injection valves 44. At the same time, the engine control unit 60 detects the engine torque (will be referred to as "the actual torque", hereinbelow) and outputs it to the traction control unit 70.

The ignition timing control, the fuel injection control and detection of the engine torque which are effected by the engine control unit 60 will be described, hereinbelow.

First the ignition timing control is effected in the following manner. The engine control unit 60 determines an optimal ignition timing according to the engine speed Ne represent by the signal from the engine speed sensor 62 and the intake air pressure P represented by the signal from the pressure sensor 61 referring to an ignition timing map where the ignition timing is related to the engine speed Ne and the intake air pressure P. Then the engine control unit 60 outputs an ignition timing control signal so that the spark plugs 47 are actuated at the ignition timing.

The fuel injection control is effected in the following manner.

The engine control unit 60 sets a base fuel injection amount on the basis of the engine speed Ne and the intake air pressure P, and determines a final fuel injection amount by adding to the base fuel injection amount various correction values calculated on the basis of signals from various sensors such as a coolant temperature sensor (not shown). Then the engine control unit 60 outputs a fuel injection signal so that the fuel injection valves 44 inject fuel in the final injection amount.

Detection of the engine torque is effected in the following manner.

That is, the engine control unit 60 is provided with first to tenth engine torque maps which are set with the engine speed Ne and the intake air pressure P used as parameters as shown in FIGS. 9 to 18. In each engine torque map, the measured values of the engine torque for various combinations of the engine speed Ne and the intake air pressure P are given. The intake air pressure P is based on the normal atmospheric pressure. In the first engine torque map shown in FIG. 9, measured values of the engine torque when the engine is operated under the normal condition are given. In the second engine torque map shown in FIG. 10, measured values of the engine torque when the engine is operation with the ignition timing retarded are given. In the third engine torque map shown in FIG. 11, measured values of the engine torque when the engine is operated with fuel supply to one cylinder cut are given. In the fourth engine torque map shown in FIG. 12, measured values of the engine torque when the engine is operated with the ignition timing retarded and fuel supply to one cylinder cut are given. In the fifth engine torque map shown in FIG. 13, measured values of the engine torque when the engine is operated with fuel supply to two cylinders cut are given. In the sixth engine torque map shown in FIG. 14, measured values of the engine torque when the engine is operated with the ignition timing retarded and fuel supply to two cylinders cut are given. In the seventh engine torque map shown in FIG. 15, measured values of the engine torque when the engine is operated with fuel supply to three cylinders cut are given. In the eighth engine torque map shown in FIG. 16, measured values of the engine torque when the engine is operated with fuel supply to four cylinders cut are given. In the ninth engine torque map shown in FIG. 17, measured values of the engine torque when the engine is operated with fuel supply to five cylinders cut are given. In the tenth engine torque map shown in FIG. 18, measured values of the engine torque when the engine is operated with fuel supply to all the cylinders cut are given. A torque down inhibition zone is provided in each of the second to tenth engine torque maps on the low-engine speed light-load side (the hatched part in each of FIGS. 9 to 18).

The engine control unit 60 selects one of the first to tenth engine torque maps according to a predetermined routine, and reads out the actual engine torque Tr corresponding to the engine speed Ne and the intake air pressure P from the engine torque map selected. When the engine is operating under the normal condition, the first engine torque map is selected, and assuming that the engine speed Ne is 2000 rpm and the intake air pressure P is −600 mmHg, the actual engine torque Tr is 4.0 kgfm.

The traction control unit 70 receives wheel speed signals from wheel speed sensors 71 to 74 for detecting the wheel speeds of the left and right front wheels 1 and 2 and the left and right rear wheels 3 and 4, an idle signal from an idle switch 75 which detects that the throttle valve 46 is in the full closed position, an actual engine torque signal from the engine control unit 60 and the like and effects the traction control under a predetermined condition. At the same time, the traction control unit 70 turns on an indicator lamp 76 when effecting the traction control.

The traction control unit 70 reads the wheel speed signals from the wheel speed sensors 71 to 74 and the actual engine torque signal from the engine control unit 60 every control period (e.g., 7 ms), and calculates the vehicle speed Vr, the friction coefficient μ of the road surface and the longitudinal acceleration Va of the vehicle on the basis of these signals and calculates the rates of slip S1 of the driving wheels 1 and 2 on the basis of the vehicle speed Vr. Further the traction control unit 70 sets various threshold values for the traction control.

The vehicle speed Vr, the friction coefficient μ of the road surface and the acceleration Va of the vehicle are calculated in the following manner.

The traction control unit 70 adopts as the vehicle speed Vr the lower of the wheel speeds W3 and W4 of the left and right rear wheels 3 and 4 (the driven wheels) detected by the wheel speed sensors 73 and 74. Then the traction control unit 70 calculates the longitudinal acceleration Va of the vehicle on the basis of change in the vehicle speed Vr, and sets a friction coefficient μ of the road surface to a value determined according to the vehicle speed Vr and the acceleration Va of the vehicle referring to a μ table (table 6) where the friction coefficient μ of the road surface is related to the vehicle speed Vr and the acceleration Va of the vehicle.

TABLE 6

| | 0 — Va → high | | | | | | | |
|---|---|---|---|---|---|---|---|---|
| 0 | 1 | 1 | 2 | 2 | 3 | 3 | 4 | 4 | 5 |
| | 1 | 1 | 2 | 2 | 3 | 4 | 4 | 5 | 5 |
| | 1 | 1 | 2 | 3 | 3 | 4 | 4 | 5 | 5 |
| Vr | 1 | 1 | 2 | 3 | 4 | 4 | 5 | 5 | 5 |
| | 1 | 1 | 2 | 3 | 4 | 5 | 5 | 5 | 5 |
| | 1 | 2 | 2 | 4 | 4 | 5 | 5 | 5 | 5 |
| ↓ | 1 | 2 | 3 | 4 | 5 | 5 | 5 | 5 | 5 |
| high | 1 | 2 | 3 | 5 | 5 | 5 | 5 | 5 | 5 |

As can be seen from table 6, the friction coefficient μ of the road surface is increased with increase in the vehicle speed Vr and in the acceleration Va of the vehicle. =p Then the traction control unit 70 sets a threshold value Ss for starting the traction control and a threshold value Se for terminating the traction control in the following manners. That is, the traction control unit 70 reads out a base value Sso of the threshold value Ss for starting the traction control on the basis of the vehicle speed Vr and the friction coefficient μ of the road surface referring to a preset map (table 7) where the base value Sso of the threshold value Ss is given using the vehicle speed Vr and the friction coefficient μ of the road surface as parameters. Then the traction control unit 70 calculates the "final" threshold value Ss for starting the traction control according to the following formula (2)

$$Ss = Sso \times K1 \tag{2}$$

wherein K1 represents a torque-based correction coefficient.

TABLE 7

| | | 0 — Vr → high | | | | | |
|---|---|---|---|---|---|---|---|
| | | 1 | 10.0 | 9.0 | 7.0 | 6.0 | 5.0 | 4.0 |
| | | 2 | 11.0 | 10.0 | 9.0 | 8.0 | 7.0 | 6.0 |
| μ | | 3 | 12.0 | 11.0 | 10.0 | 9.0 | 8.0 | 7.0 |
| | | 4 | 13.0 | 12.0 | 11.0 | 10.0 | 9.0 | 8.0 |
| | | 5 | 14.0 | 13.0 | 12.0 | 11.0 | 10.0 | 9.0 |

The torque-based correction coefficient K1 is increased with increase in the actual engine torque Tr as shown in the following table 8.

TABLE 8

| Tr (Kgfm) | 0   | ... | ... | 22  | 23 | 24 | 25 |
|-----------|-----|-----|-----|-----|----|----|----|
| K1        | 0.8 | ... | ... | 1.5 | 3  | 5  |    |

The traction control unit 70 reads out a base value Seo of the threshold value Se for terminating the traction control on the basis of the vehicle speed Vr and the friction coefficient μ of the road surface referring to a preset map (table 9) where the base value Seo of the threshold value Se is given using the vehicle speed Vr and the friction coefficient μ of the road surface as parameters. Then the traction control unit 70 calculates the "final" threshold value Se for terminating the traction control according to the following formula (3)

$$Se = Seo \times K1 \qquad (3)$$

wherein K1 represents said torque-based correction coefficient.

TABLE 9

|   |   | 0 —Vr→ high |     |     |     |     |     |
|---|---|-----|-----|-----|-----|-----|-----|
| μ | 1 | 3.0 | 3.0 | 2.0 | 2.0 | 1.0 | 1.0 |
|   | 2 | 4.0 | 3.0 | 3.0 | 3.0 | 2.0 | 2.0 |
|   | 3 | 5.0 | 5.0 | 4.0 | 4.0 | 3.0 | 3.0 |
|   | 4 | 6.0 | 6.0 | 5.0 | 5.0 | 4.0 | 4.0 |
|   | 5 | 7.0 | 7.0 | 6.0 | 6.0 | 5.0 | 5.0 |

The base value Seo of the threshold value Se for terminating the traction control is set smaller than the base value Sso of the threshold value Ss for starting the traction control.

Then the traction control unit 70 calculates the rates of slip S1 and S2 of the left and right front wheels 1 and 2 and determines whether the driving wheels 1 and 2 are slipping on the basis of the rates of slip S1 and S2.

That is, the traction control unit 70 calculates the rates of slip S1 and S2 of the left and right front wheels 1 and 2 by subtracting the vehicle speed Vr from the driving wheel speeds W1 and W2, and averages the rates of slip S1 and S2 to calculate an average rate of slip SAv. When the larger of the rates of slip S1 and S2 of the left and right front wheels 1 and 2 (to be referred to as "the maximum rate of slip SHi", hereinbelow) is larger than the threshold value Ss for starting the traction control, the traction control unit 70 determines that the front wheels 1 and 2 are slipping and sets slip flag Fs to 1. When the maximum rate of slip SHi comes to be smaller than the threshold value Se for terminating the traction control, the traction control unit 70 determines that the driving wheels 1 and 2 are not slipping and resets the slip flag Fs to 0.

The traction control unit 70 sets a traction flag Ft to 1 and initiates the traction control when the slip flag Fs is set to 1, and resets the traction flag Ft to 0 and terminates the traction control a predetermined time t after the slip flag Fs is reset to 0. The traction control unit 70 effects the traction control by controlling the engine output through the engine control unit 60.

In this particular embodiment, the traction flag Ft is reset to 0 and the traction control is forcedly terminate when the signal from the idle switch 46 turns on, i.e., when the accelerator pedal is released.

The engine control for the traction control executed by the traction control unit 70 and the engine control unit 60 will be described hereinbelow. In the traction control unit 70, the engine control is effected according to the flow chart shown in FIG. 19.

That is, the traction control unit 70 reads various signals in step T1 and determines in step T2 whether the traction flag Ft has been set to 1 which indicates that the traction control is being effected. When it is determined that the traction flag Ft has been set to 1, the traction control unit 70 determines in step T3 whether it is a first control, i.e., whether the traction control is just initiated. When it is determined that it is the first control, the traction control unit 70 executes in step T4 a predetermined feedforward target torque setting process to calculate a target torque To. Then the traction control unit 70 outputs the target torque To to the engine control unit 60. (step T5)

Figure 20:
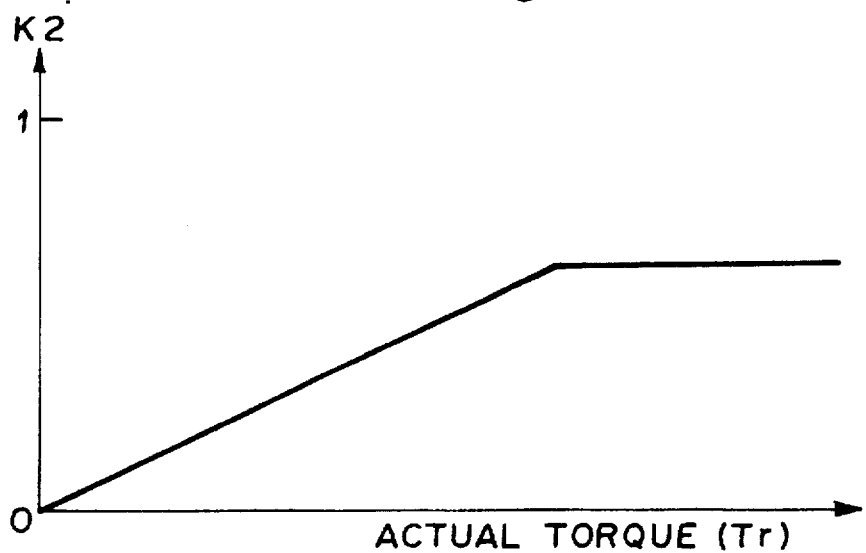
FIG. 20 is a map for setting the torque correction coefficient which is used in the feedforward target torque setting process.

That is, the traction control unit 70 reads out a torque correction coefficient K2 from a map shown in FIG. 20 and calculates the target torque on the basis of the torque correction coefficient K2 and the actual engine torque Tr according to the following formula (5).

$$To = Tr - Tr \cdot K2 \qquad (5)$$

The torque correction coefficient K2 is linearly increased within the range of 0 to 1 with increase in the actual engine torque Tr and is fixed to a value in the high torque side as shown in FIG. 20. Accordingly, the torque down represented by the second term of the right side of the formula (5) is smaller than the actual engine torque Tr of the first term of the right side and the target torque To of the left side is smaller than the actual engine torque Tr.

Figure 19:
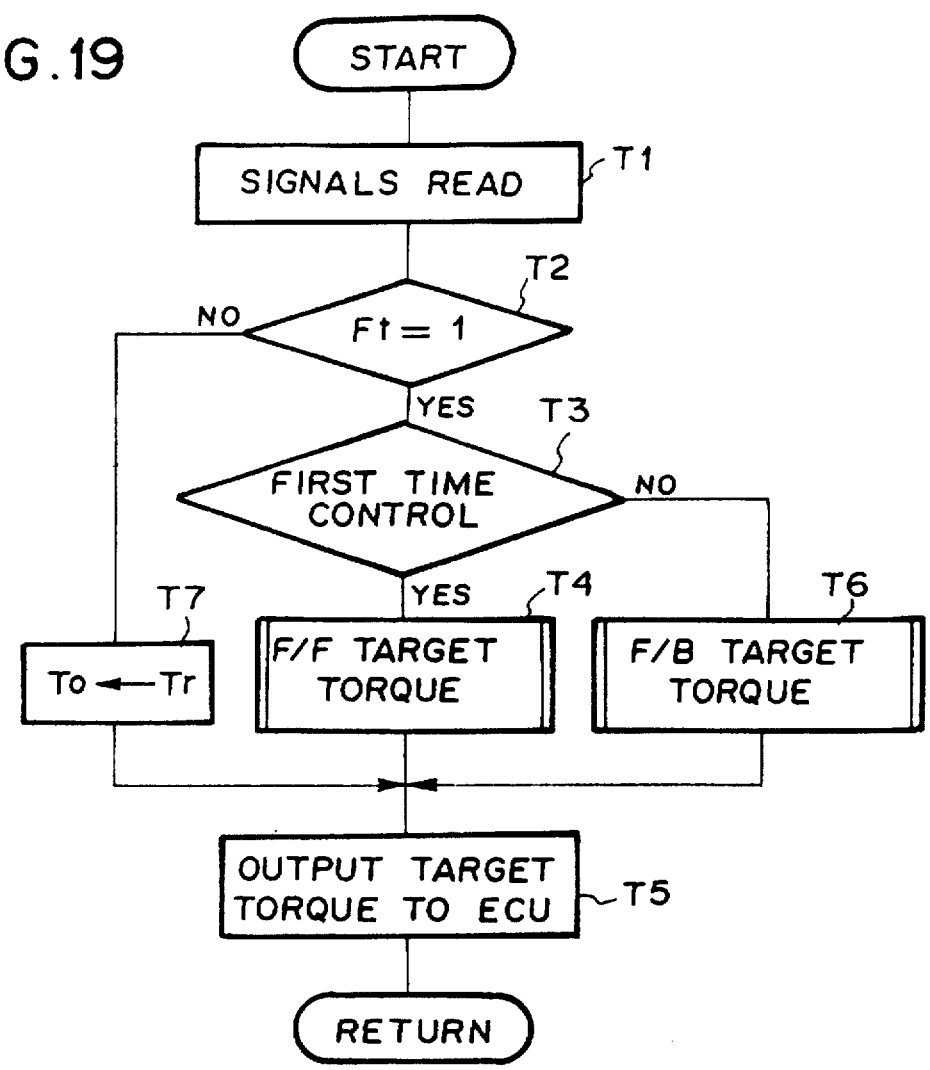
FIG. 19 is a flow chart for illustrating the engine control for traction control effected by the traction control unit.

Again in the flow chart shown in FIG. 19, when it is determined in step T3 that it is not the first control, the traction control unit 70 executes in step T6 a predetermined feedback target torque setting process to calculate a target torque To and outputs the target torque To to the engine control unit 60.

In this embodiment, when the traction flag Ft has not been set to 1, the traction control unit 70 outputs the actual engine torque Tr (input from the engine control unit 60) to the engine control unit 60 as the target torque To. (step T7)

The feedback target torque setting process in step T6 is effected in the following manner.

The traction control unit 70 first calculates a target rate of slip Te. That is, the traction control unit 70 reads out a base value Teo of a target rate of slip T9 from a map shown in table 10 in which the base value is related to the vehicle speed Vr and the friction coefficient μ of the road surface and sets a target rate of slip Te on the basis of the base value Teo and a torque-based correction coefficient K3 according to the following formula (6)

$$Te = Teo \cdot K3 \qquad (6)$$

TABLE 10

|   | O ──Vr──> high | | | | | |
|---|---|---|---|---|---|---|
| μ 1 | 5.0 | 4.0 | 3.0 | 3.0 | 3.0 | 3.0 |
| 2 | 5.0 | 4.0 | 4.0 | 3.0 | 3.0 | 3.0 |
| 3 | 5.0 | 4.0 | 4.0 | 4.0 | 3.0 | 3.0 |
| 4 | 6.0 | 5.0 | 5.0 | 4.0 | 4.0 | 4.0 |
| 5 | 6.0 | 5.0 | 5.0 | 5.0 | 4.0 | 4.0 |

The torque-based correction coefficient K3 is increased with increase in the actual engine torque Tr as shown in the following table 11.

TABLE 8

| Tr(Kgfm) | 0 | ... | ... | 22 | 23 | 24 | 25 |
|---|---|---|---|---|---|---|---|
| K3 | 0.8 | ... | ... | ... | 1.5 | 3 | 5 |

Then the traction control unit 70 calculates the difference ΔSe between the target rate of slip Te and the average rate of slip SAv (the following formula (7)) and the rate of change DSe of the difference ΔSAe (the following formula (8)).

$$\Delta Se = SAv - Te \tag{7}$$

$$DSe = \Delta Se_{(k)} - \Delta Se_{(k-1)} \tag{8}$$

wherein $\Delta Se_{(k)}$ represents the present value of the differenceΔSe and $\Delta Se_{(k-1)}$ represents the preceding value of the same.

Then the traction control unit 70 reads out a torque down coefficient K on the basis of the difference ΔSe and the rate of change DSe of the difference ΔSe from a map shown in FIG. 12. Then the traction control unit 70 calculates the target torque To according to the following formula (9).

$$To = Tr - Tr \cdot K \tag{9}$$

When the torque down coefficient K is positive, the target torque To is smaller than the actual engine torque Tr and when the torque down coefficient K is negative, the target torque To is larger than the actual engine torque Tr. When the torque down coefficient K is 1, the target torque To is 0.

Figure 21:
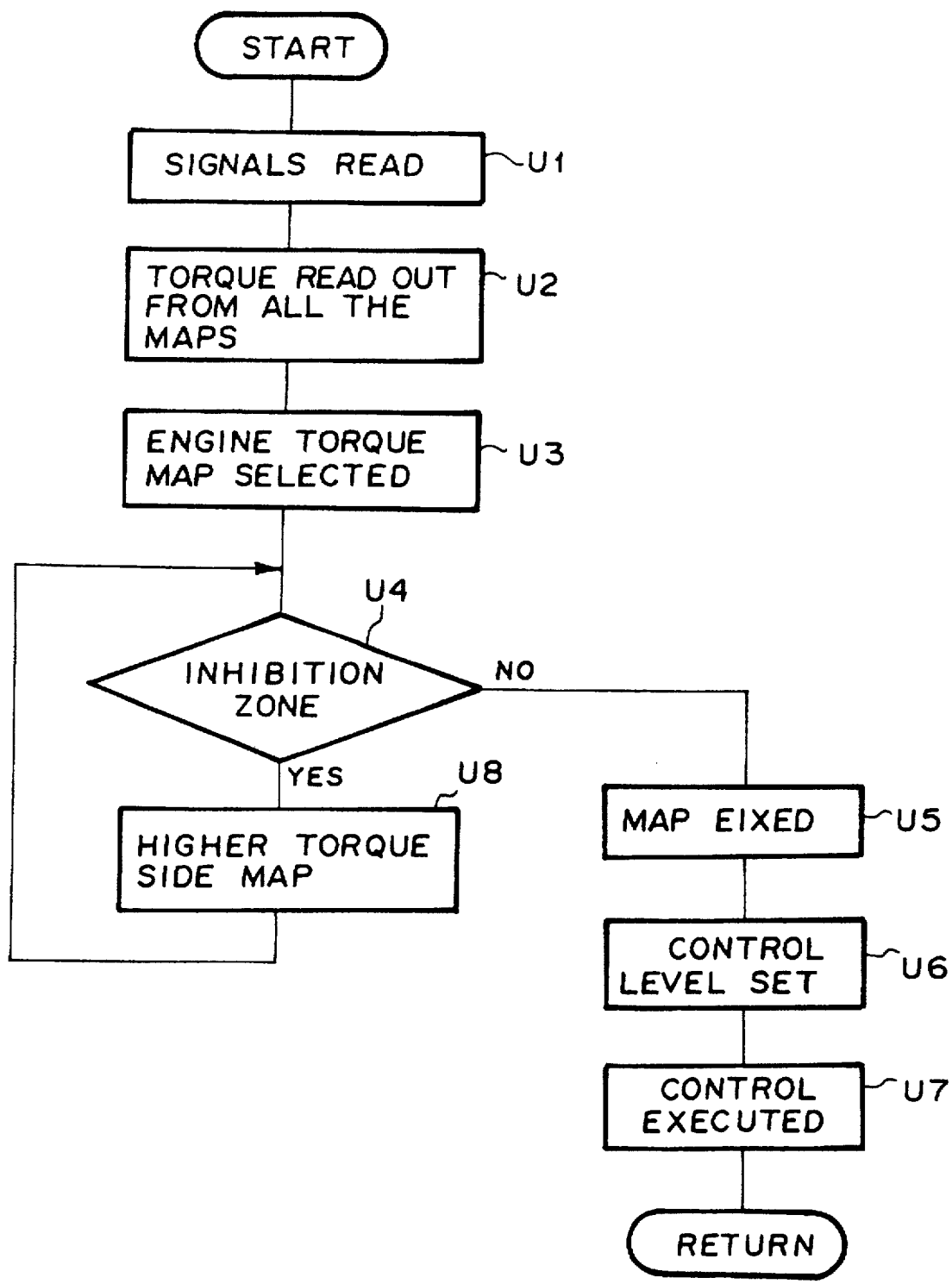
FIG. 21 is a flow chart for illustrating the engine control for traction control effected by the engine control unit.

The engine control unit 60 controls the engine, for instance, according to the flow chart shown in FIG. 21.

That is, the engine control unit 60 reads various signals in step U1 and reads out all the engine torques corresponding to the operating condition of the engine determined the engine speed Ne and the intake air pressure from the first to tenth engine torque maps in step U2. Then the engine control unit 60 selects the engine torque map from which the engine torque closest to the target torque To is read out. (step U3)

Then the engine control unit 60 determines in step U4 whether the engine torque corresponding to the operating condition of the engine is in the torque down inhibition zone in the selected engine torque map. When it is determined that the engine torque corresponding to the operating condition of the engine is not in the torque down inhibition zone, the engine torque map selected in step U3 is finally used. (step U5)

Then the engine control unit 60 reads out an engine control level L corresponding to the number of the engine torque map finally selected from the map shown in the following table 13. (step U6)

TABLE 13

| map No. | 1 | 2 | 3 | 4 | 5 | 6 | 7 | 8 | 9 | 10 |
|---|---|---|---|---|---|---|---|---|---|---|
| control level(L) | 0 | 1 | 2 | 3 | 4 | 5 | 6 | 7 | 8 | 9 |

The engine control unit 60 effects fuel cut and/or ignition timing retardation according to a fuel cut pattern and retardation of the ignition timing determined according to the engine control level FC thus obtained referring to a preset engine control table (table 14). (step U7)

TABLE 12

|  | (−) <────── DSe ──────> (+) | | | | | | | |
|---|---|---|---|---|---|---|---|---|
| ΔSe (−) ↑ ↓ (+) | −0.8 | −0.8 | −0.7 | −0.5 | −0.5 | −0.3 | −0.2 | 0 |
| | −0.8 | −0.7 | −0.5 | −0.3 | −0.2 | −0.1 | 0 | 0.2 |
| | −0.7 | −0.5 | −0.3 | −0.2 | −0.1 | 0 | 0.1 | 0.2 |
| | −0.5 | −0.3 | −0.2 | −0.1 | 0 | 0.1 | 0.3 | 0.3 |
| | −0.5 | −0.2 | −0.1 | 0 | 0.1 | 0.2 | 0.4 | 0.6 |
| | −0.3 | −0.1 | 0 | 0.1 | 0.2 | 0.4 | 0.5 | 0.7 |
| | −0.2 | 0 | 0.1 | 0.3 | 0.5 | 0.7 | 0.8 | 0.9 |
| | 0 | 0.2 | 0.2 | 0.3 | 0.6 | 0.8 | 0.9 | 1.0 |

TABLE 14

| FC | \multicolumn{6}{c}{cylinder} | retard |
|---|---|---|---|---|---|---|---|
|  | 1 | 2 | 3 | 4 | 5 | 6 |  |
| 0 |   |   |   |   |   |   |        |
| 1 |   |   |   |   |   |   | retard |
| 2 | x |   |   |   |   |   |        |
| 3 | x |   |   |   |   |   | retard |
| 4 | x | x |   |   |   |   |        |
| 5 | x | x |   |   |   |   |        |
| 6 | x | x | x |   |   |   | retard |
| 7 | x | x | x | x |   |   |        |
| 8 | x | x | x | x | x |   |        |
| 9 | x | x | x | x | x | x |        |

In table 14, x indicates that fuel supply to the corresponding cylinder is to be cut. As can be seen from table 14, as the value of the engine control level FC increases, the number of the cylinders fuel supply to which is to be cut increases and the engine output is lowered. Further when the ignition timing is retarded, the engine output is lowered. When the engine control level FC is 0, the engine 40 is operated under the normal condition.

When it is determined in step U4 that the engine torque corresponding to the operating condition of the engine is in the torque down inhibition zone in the selected engine torque map, the engine control unit 60 determines whether the engine torque corresponding to the operating condition of the engine is in the torque down inhibition zone in the engine torque map which is on the higher torque side of the selected engine torque map by one step. (step U8) Thus the engine control unit 60 determines, as the engine torque map to be actually used, the engine torque map which is the closest to the selected engine torque map in the engine torque maps in which the engine torque corresponding to the operating condition of the engine is not in the torque down inhibition zone.

The basic operation of the traction control effected by the traction control unit 70 and the engine control unit 60 associated with each other will be described, hereinbelow.

Figure 22:
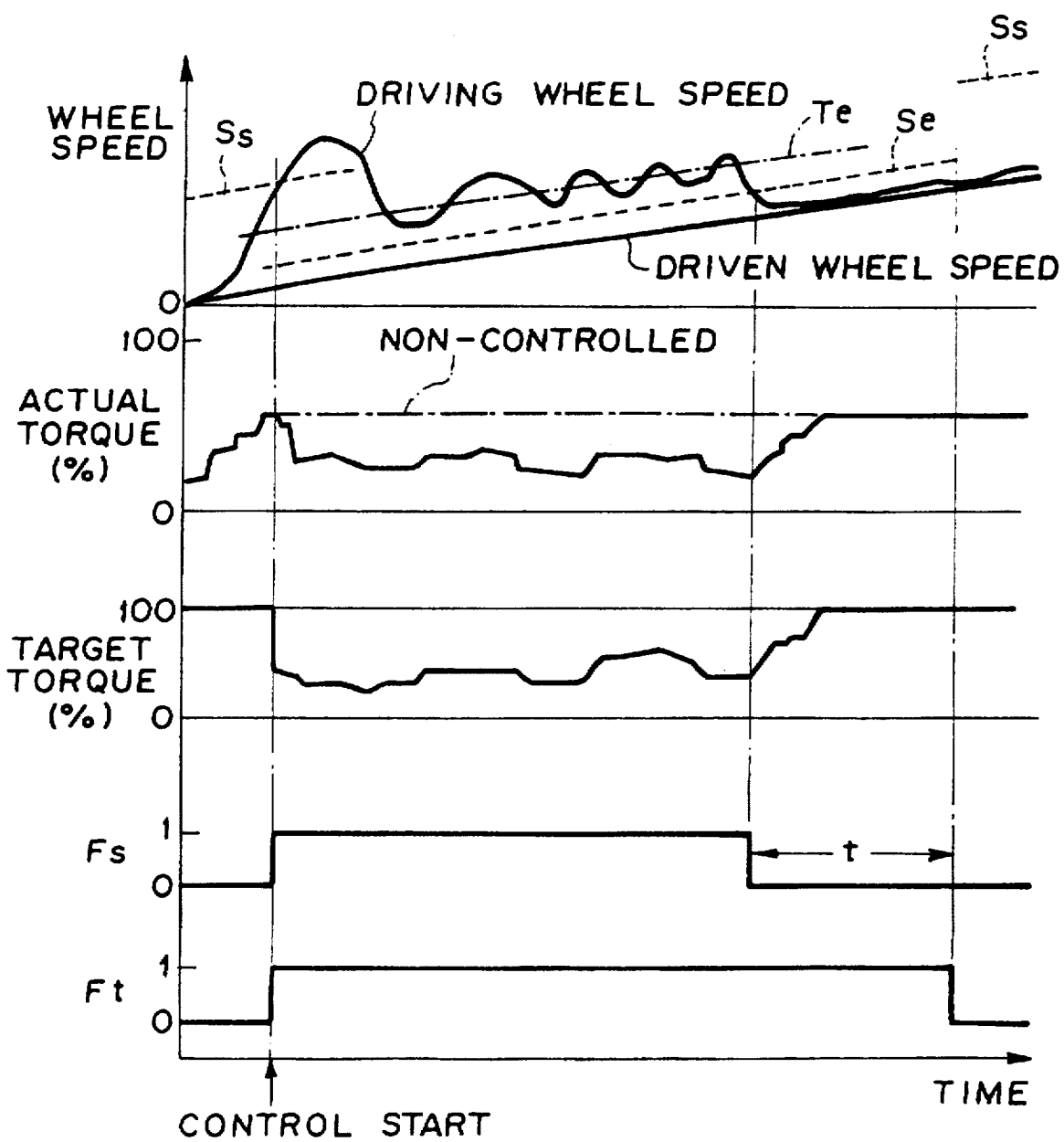
FIG. 22 is a time chart for illustrating an example of the traction control effected by the second embodiment.

For example, when the maximum rate of slip SHi of the driving wheels exceeds the threshold value Ss for starting the traction control for the first time as shown in FIG. 22, the traction control unit 70 sets slip flag Fs to 1 and then initiates the traction control. At this time, traction flag Ft is set to 1 to indicate that the traction control is being effected and the indicator lamp 27 is turned on. The target engine torque To is greatly lowered in a period immediately after initiation of the traction control. That is, immediately after initiation of the traction control, the target engine torque To is calculated on the basis of the torque correction coefficient K2 and the actual engine torque Tr according to the formula (5). Since the torque correction coefficient K2 is smaller than 1, the target engine torque To becomes smaller than the actual engine torque Tr, and the value of the target engine torque To is output to the engine control unit 60. At this time, assuming that the target engine torque To is set to 2.4 kgfm, the engine speed Ne is 2000 rpm and the intake air pressure P is −600 mmHg, the engine control unit 60 selects the fifth engine torque map and the engine control level FC is set to 6, whereby fuel supply to two cylinders is cut. Accordingly the actual engine torque Tr of the engine 40 is quickly lowered as compared with the non-controlled state shown by the chained line, whereby the traction control exhibits an excellent initial response.

While the traction control is being effected, the target engine torque To is increased and reduced so that the rates of slip S1 and S2 of the driving wheels 1 and 2 are converged on the target rate of slip Te and the engine 40 is controlled following the change in the target engine torque To. For example, when the target engine torque To is set to 2.0 kgfm according to the formula (9) with the engine speed Ne being 2000 rpm and the intake air pressure P being −600 mmHg, the sixth engine torque map is selected, whereby the engine control level FC is shifted from 6 to 7 and the ignition timing retarded with fuel supply to two cylinders cut. Since the formula (9) is a function of the actual engine torque Tr, the target engine torque To accurately corresponds to the actual engine torque Tr of the engine 40, whereby an excellent control accuracy is obtained.

The control described above is repeated until the maximum rate of slip SHi of the driving wheels 1 and 2 falls below the threshold value Se for terminating the traction control. When the maximum rate of slip SHi of the driving wheels 1 and 2 falls below the threshold value Se for terminating the traction control, the slip flag Fs is reset to 0 and the traction flag Ft is reset to 0 a predetermined time t after reset of the slip flag Fs. Thus the traction control is terminated.

The termination of the traction control which is the important feature of the second embodiment will be described in more detail with reference to the flow chart shown in FIG. 23.

Figure 23:
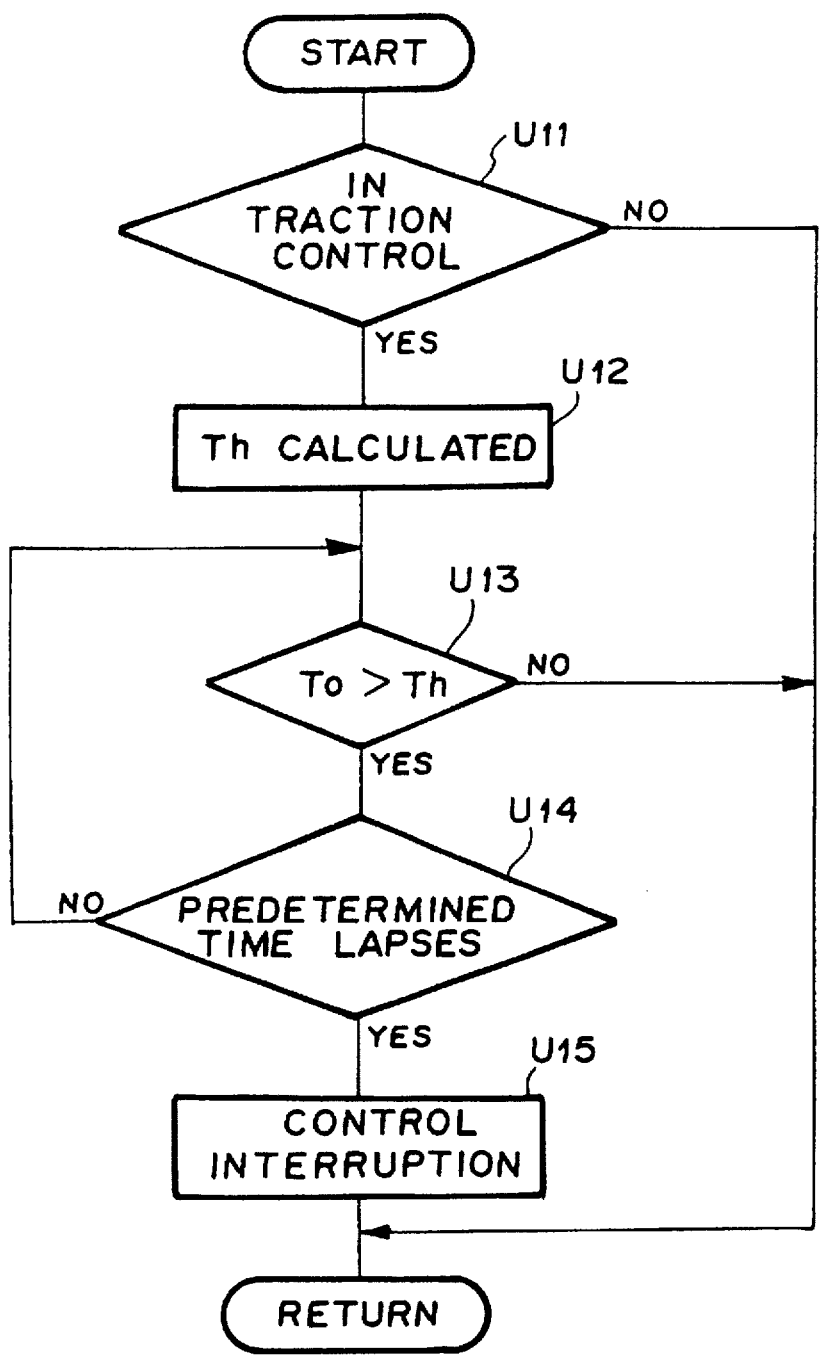
FIG. 23 is a flow chart for illustrating the traction control terminating operation in the second embodiment.
Figure 24:
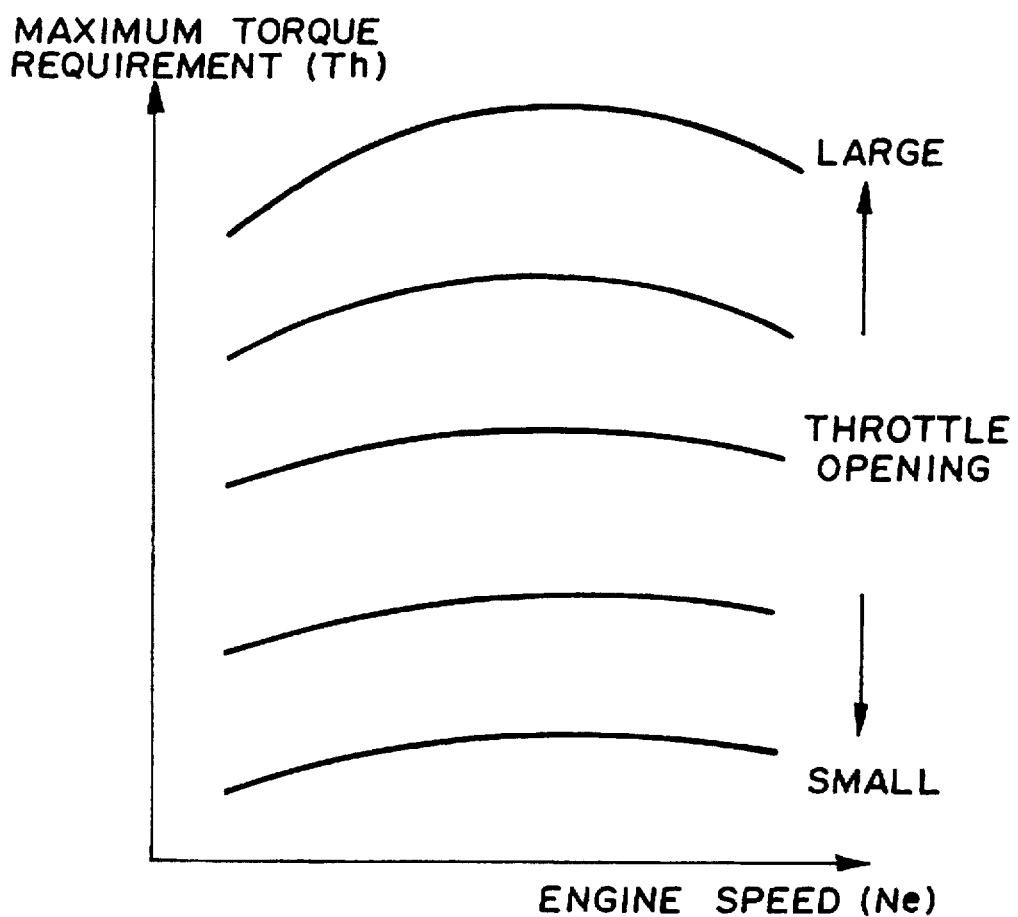
FIG. 24 is a maximum torque requirement map used in the traction control terminating operation.

In FIG. 23, the engine control unit 60 determines whether the traction control is being effected (step U11) and when it is determined that the traction control is being effected, the engine control unit 60 calculates in step U12 a maximum torque requirement Th corresponding to the driver's engine output requirement. That is, the engine control unit 60 is provided with a maximum torque requirement map in which the maximum torque requirement Th is given with the engine speed and the throttle opening used as parameters as shown in FIG. 24, and reads out the maximum torque requirement Th on the basis of the engine speed Ne and the throttle opening θ according to the map shown in FIG. 24. In the maximum torque requirement map, the maximum torque requirement generally increases with increase in the throttle opening θ which corresponds to the opening of the accelerator, which is operated by the driver. Accordingly, when the accelerator opening is small or the driver's engine output requirement is small, the maximum torque requirement Th is small, and as the accelerator opening becomes larger, the maximum torque requirement Th becomes larger.

Then the engine control unit 60 compares the maximum torque requirement Th with the target engine torque To input from the traction control unit 70, and when the target engine torque To is kept larger than the maximum torque requirement Th for a predetermined time (e.g., 2 seconds), the engine control unit 60 outputs a traction control interruption signal to the traction control unit 70. (steps U13 to U15) Upon receipt of the traction control interruption signal, the traction control unit 70 resets the traction flag Ft to 0 and turns off the indicator lamp 27. Thus, the problem that the traction control is unnecessarily continued even after the slip of the driving wheels is suppressed can be avoided. Further since the traction control is not terminated until the target engine torque To is kept larger than the maximum torque requirement Th for a predetermined time, the driving wheels cannot slip again after termination of the traction control.

Since the target engine torque To is constantly output from the traction control unit 70 to the engine control unit 60, the engine control unit 60 quickly initiates, for instance, the traction control by simply changing the value of the target engine torque To, whereby quick response of the system can be ensured.

Especially in the embodiment described above, when the traction control is not effected, the actual engine torque Tr output from the engine control unit 60 to the traction control unit 70 is echoed back to the engine control unit 60 as the target engine torque To, and accordingly, the engine output can be prevented from being inadvertently lowered while the traction control is not effected and at the same time, the engine control unit 60 need not determine whether or not the traction control is to be effected.

What is claimed is:

1. A traction control system for a vehicle provided with an engine comprising a wheel speed detecting means for detecting the wheel speeds of the vehicle, a slip rate calculating means for calculating the rate of slip of the driving wheels on the basis of the wheel speeds detected by the wheel speed detecting means and an engine output controller which when the rate of slip of the driving wheels is larger than a predetermined value, feedback-controls the engine output so that the rate of slip of the driving wheels converges on a predetermined target value, wherein the improvement comprises an accelerator position detecting means which detects depression of the accelerator pedal and a control gain changing means which increases a control gain of a feedback control variable of the feedback control of the engine output controller when the accelerator position detecting means detects that the accelerator pedal is released.

2. The traction control system as defined in claim 1, further comprising an indicator means for indicating that the traction control is being effected, and an indicator control means for controlling operation of said indicator means.

3. The traction control system as defined in claim 2, wherein said indicator control means causes the indicator means to stop indicating that the traction control is being effected when the accelerator position detecting means detects that the accelerator pedal is released.

4. The traction control system as defined in claim 3, wherein said indicator control means inhibits the indicator means from indicating that the traction control is being effected when the accelerator position detecting means detects that the accelerator is depressed after it is once caused to stop indication even if the feedback control variable remains, unless the rate of slip of the driving wheels exceeds the predetermined value for starting the traction control.

5. The traction control system as defined in claim 4, wherein said indication means resumes indication when the accelerator position detecting means detects that the accelerator is depressed after the indicator means is caused to stop the indication and when a rate of slip of the driving wheels exceeds the predetermined value for starting the traction control.

* * * * *